United States Patent [19]

Bier et al.

[11] Patent Number: 5,133,052
[45] Date of Patent: Jul. 21, 1992

[54] INTERACTIVE GRAPHICAL SEARCH AND REPLACE UTILITY FOR COMPUTER-RESIDENT SYNTHETIC GRAPHIC IMAGE EDITORS

[75] Inventors: Eric A. Bier, Los Altos, Calif.; David J. Kurlander, New York, N.Y.

[73] Assignee: Xerox Corporation, Stamford, Conn.

[21] Appl. No.: 228,882

[22] Filed: Aug. 4, 1988

[51] Int. Cl.$^5$ .............................................. G09G 1/06
[52] U.S. Cl. .................................... 395/155; 395/133; 395/136
[58] Field of Search ............................... 364/518-522; 382/41, 44, 45, 16, 25, 40, 30, 48; 340/723, 747; 395/155, 133, 136

[56] References Cited

U.S. PATENT DOCUMENTS

| | | | |
|---|---|---|---|
| 4,078,249 | 3/1978 | Zelke et al. | 364/200 |
| 4,665,555 | 5/1987 | Alker et al. | 382/41 |
| 4,745,561 | 5/1988 | Hirosawa et al. | 364/523 |
| 4,776,020 | 10/1988 | Kosaka et al. | 382/16 X |
| 4,800,510 | 1/1989 | Vinberg et al. | 364/520 X |

FOREIGN PATENT DOCUMENTS 0283267 9/1988 European Pat. Off. .

OTHER PUBLICATIONS

Kurlander et al., "Graphical Search & Replace", Computer Graphics, vol. 22, No. 4, Aug. 1988, pp. 113-120.
Word Perfect Version 4.2, Manual, pp. R-83,84,131,132 137,138,169,170, Jan. 1987.
Bier, Eric A. and Stone, Maureen C. Snap-Dragging Proceedings of SIGGRAPH '86; Aug. 18-22, 1986; Dalas, Texas. In Computer Graphics 20:4233-240 (Aug. 1986).
Burr, D. J. A Technique for Comparing Curves. Proceeding of IEEE Computer Society Conference on Pattern Recognition and Image Processing; Chicago, Illinois; Aug. 6-8, 1979; 271-277.
Chang, Shi-Kuo; Shi, Qing-Tin; and Yan, Cheng-Wen. Iconic Indexing by 2D Strings. IEEE Computer Society Workshop on Visual Languages; Dallas, Texas; Jun. 25-27, 1986; 12-21.
Freeman, Herbert. Shape Description Via the Use of Critical Points. Pattern Recognition. 1978; 10(3):159-166.
Gips, James. Shape Grammars and Their Uses: Artificial Perception, Shape Generation and Computer Aesthetics. Basel, Switzerland: Birkhauser Verlag; 1975.
Levine, Martin D. Vision in Man and Machine. New York: McGraw Hill; 1983, Ch. 10, 480-544.
Palermo, Frank and Weller, Dan. Some Database Requirements for Pictorial Applications. In Goos G. and Hamanis J., eds., Lecture Notes in Computer Science 81; Blaster, A., ed., Data Base Techniques for Pictorial Applications (Florence, Italy, Jun. 1979). Berlin: Springer-Verlag; 1980.
Pavlidis, Theodosios. A Review of Algorithms for Shape Analysis. Computer Graphics and Image Processing; 1978; 7: 243-258.
Pier, Kenneth A. A Retrospective on the Dorado, a High-Performance Personal Computer Palo Alto, CA: Xerox Palo Alto Research Center, Intelligent Systems Laboratory; Aug. 1983, ISL-83-1.
Pier, K.; Bier, E., Stone, M. An Introduction to Gargoyle: An Interactive Illustration Tool. In: van Vilet, J. C., ed., Document Manipulation and Typography; Proceedings of International Conferences on Electronic Publish., Docu. Manipulation and Typography; 1988; Nice, France. Cambridge University Press; 1988; 223-238.

(List continued on next page.)

Primary Examiner—Heather R. Herndon

[57] ABSTRACT

Provision is made for search digital synthetic graphics data (e.g., displayed single page scenes, multi-page files or multi-file databases) to find graphical patterns which match a user specified graphical search pattern. Furthermore, there is support (i) for performing pre-recorded macro operations on all or some of the matches that are found, or (ii) for substituted user-specified replacements for some or all of the geometric characteristics and graphical properties of the pattern matches that are found.

8 Claims, 15 Drawing Sheets

OTHER PUBLICATIONS

Smith, Alvy Ray *Plants, Fractals, and Formal Languages.* Proceedings of SIGGRAPH '84 Minneapolis, Minnesota; Jul. 23–27, 1984, Computer Graphics 18(3); Jul. 1984; 1–10.

Stiny, George. *Pictorial and Formal Aspects of Shape and Shape Grammars.* Basel, Switzerland: Birkhauser Verlag; 1975.

Sutherland, Ivan E. Sketchpad: *A Man–Machine Graphical Communication System.* AFIPS Conference Proceedings, Spring Joint Computer Conference; 23:329–346. Baltimore, Md.: Spartan Books; 1963.

Swinehart, D. C.; Zellweger, P. T.; Beach, R. J.; and Hagmann, R, B. *A Structure View of the Cedar Programming Environment.* ACM Transaactions on Programming Languages and Systems; Oct. 1986; 8(4): 419–490.

Weller, Dan and Williams, Robin. *Graphic and Relational Data Base Support for Problem Solving.* Proceedings of SIGGRAPH '76; Philadelphia, PA; Jul. 14–16, 1976. Computer Grapics 10(2):183:189.

Wolfson, Haim. *On Curve Matching.* Courant Institute of Mathematical Sciences, New York, NY; Technical Report #256; Nov. 1986.

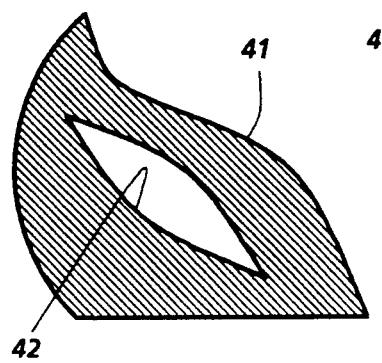
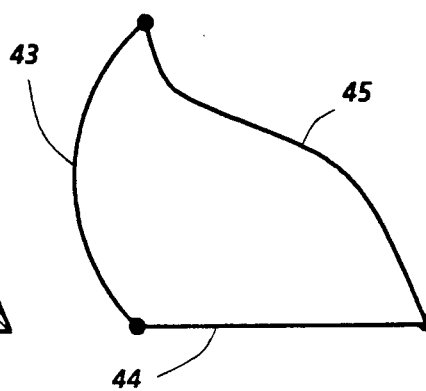
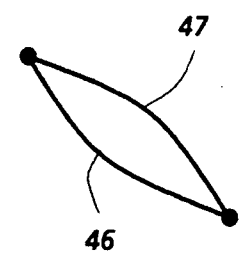
FIG. 8A     FIG. 8B     FIG. 8C
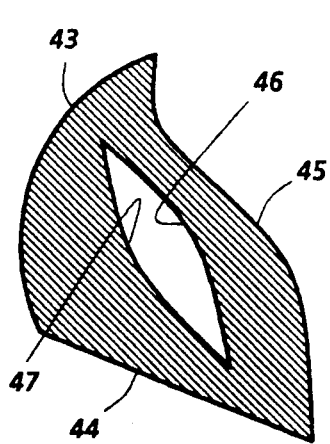
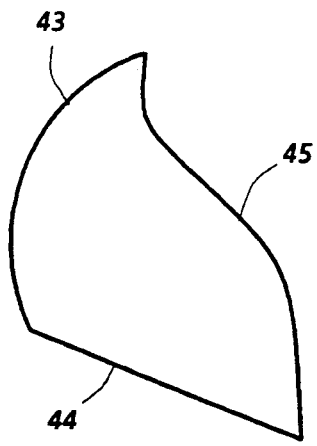
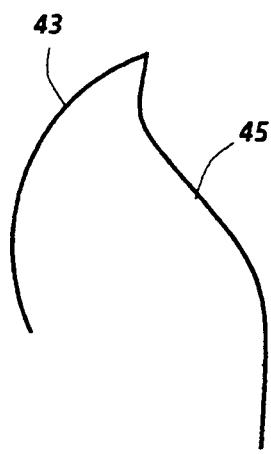
FIG. 8D     FIG. 8E     FIG. 8F

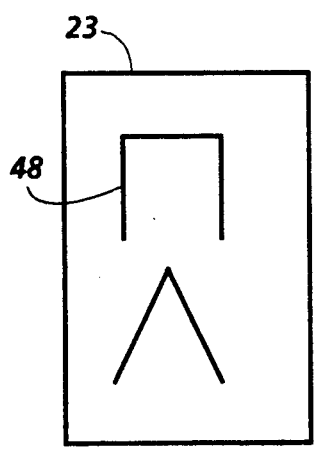 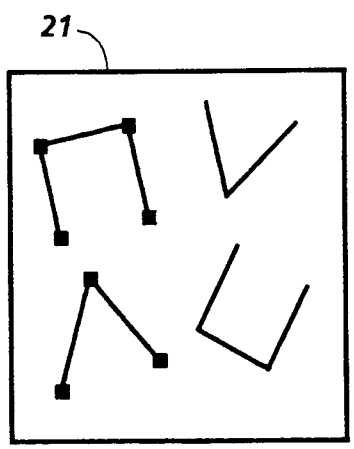 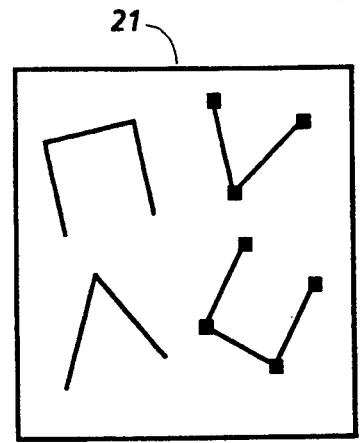
FIG. 9A    FIG. 9B    FIG. 9C
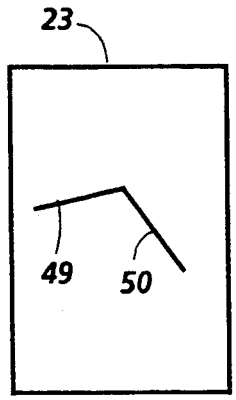 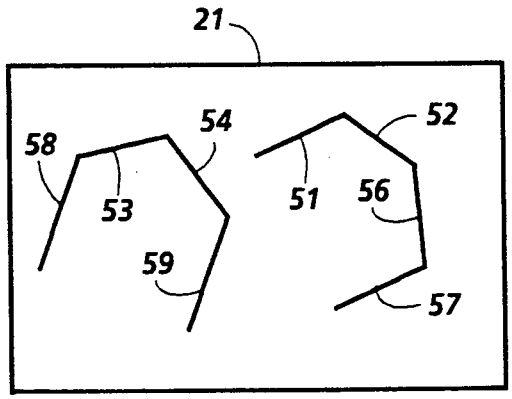
FIG. 10A    FIG. 10B
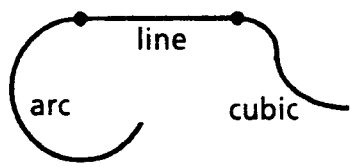
FIG. 11A
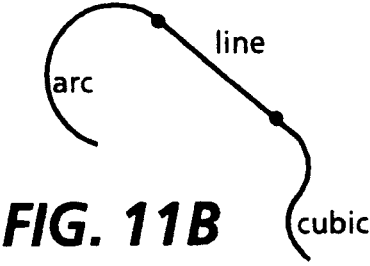
FIG. 11B
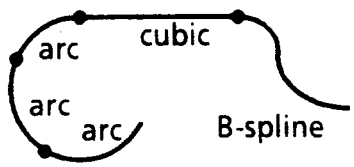
FIG. 11C

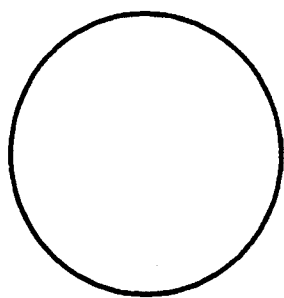
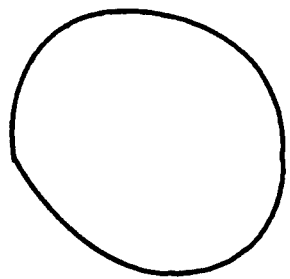
FIG. 12A     FIG. 12B
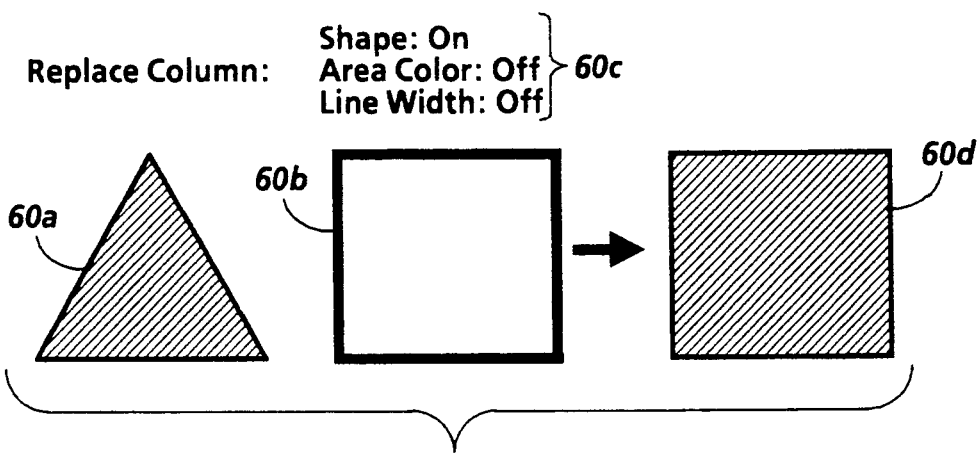
FIG. 13A
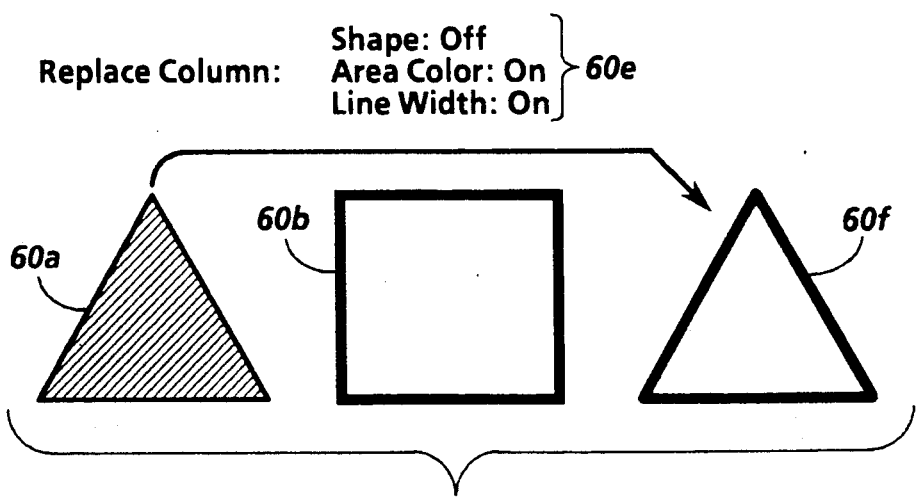
FIG. 13B

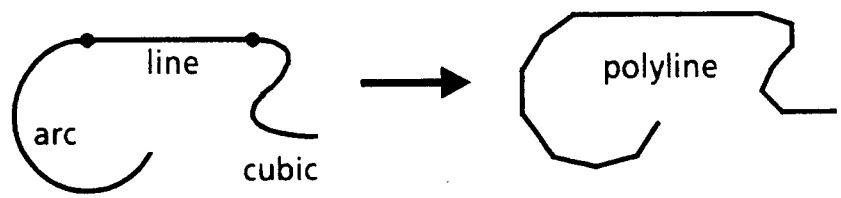
*FIG. 20A*
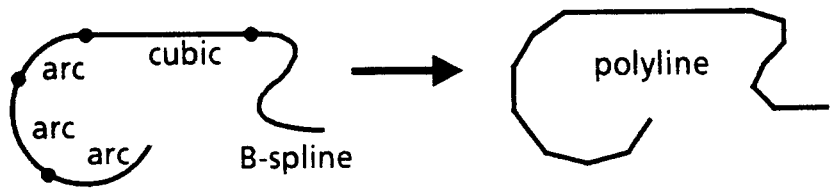
*FIG. 20B*
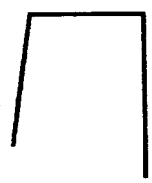 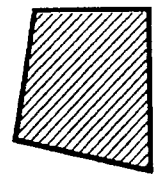
*FIG. 22A*  *FIG. 22B*
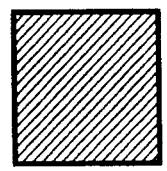 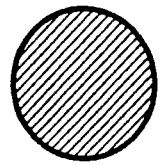
*FIG. 22C*  *FIG. 22D*

INTERACTIVE GRAPHICAL SEARCH AND REPLACE UTILITY FOR COMPUTER-RESIDENT SYNTHETIC GRAPHIC IMAGE EDITORS

FIELD OF THE INVENTION

This invention relates to interactive, digital, synthetic picture editing systems, such as computer-resident illustrators and drafting systems, as well as computer-aided geometric design (CAD) systems. More particularly, it pertains to methods and means for implementing a richly featured, user interactive graphical search and replace utility for enhancing the performance of such systems.

BACKGROUND OF THE INVENTION

Modern digital text editors and word processors commonly have search utilities for finding user-defined text string and replacement utilities for substituting a user-preferred text string for a target text string wherever the target text is found.

Synthetic graphical images often contain repeated geometric shapes and repeated graphical properties. For example, a digital illustration may have multiple instances of a given color, typeface or line width. Likewise, a certain shape may appear repeatedly in such an illustration, and the different instances of the given shape may be at different translations, rotations and magnifications. As will be appreciated, it may be necessary or desireable to "coherently" change such an illustration, whereby all instances of a repeated shape or property are modified consistently.

Prior digital graphic editors have included clustering and instancing functions for assisting users who wish to make coherent changes to illustrations. Clustering enables a user to collect objects into groups, which commonly are called "clusters," such that the objects of a given cluster can be selected and operated upon as a single unit. Properties of clustered objects, such as their color and their line width and style, can be coherently changed easily and quickly, but clustering does not facilitate changing the shape of the clustered objects. Instancing, on the other hand, permits a user to declare that a selected object is an "instance" of a library object, whereby any change made to the shape or properties of the library object are reflected automatically in all instances of that object. Clustering and instancing, however, are of limited utility. One of their drawbacks is that they require the user to decide in advance which of the objects of an illustration might require coherent editing because the illustration must be structured to cluster or instance those objects. Another of their limitations is that they do not give the user the freedom to decide on a case-by-case basis which objects are and are not to be changed.

Accordingly, it will be evident that there is a need for a graphical search and replace utility. As used herein, "graphical search" refers to a technique for finding all instances of a specified graphical pattern in an arbitrarily structured synthetic graphic image composed of objects which are defined by lines and curves or by regions bounded by lines and curves. "Graphical replace," on the other hand, refers to a technique for replacing selected characteristics (e.g., shape, color, line width, line style, text typeface) of matched objects (i.e., objects responding to a user defined search request) with new characteristics described by a user specified replacement pattern.

The foregoing definitions will suggest still further applications for a graphical search and replace utility. For example, graphical objects can be represented in a database, thereby enabling them to be accessed by queries expressed in traditional database query languages or in new languages specifically designed for formulating graphical object queries. Graphical search and replace may be used as an interface to a graphical database. It not only provides an efficient algorithm for finding curves and groups of curves, but it also permits graphical queries to be expressed simply by drawing or otherwise defining an example of the target object of such a query. Similarly, graphical search and replace may be employed for specifying graphical grammars that generate recursive shapes. Shape grammars (a subset of graphical grammars) have been investigated by others, especially as applied to producing realistic imagery. These shape grammers describe rules for replacing existing shapes with new shapes. Graphical search and replace extends the functionality of such shape grammars because it permits the user to define graphical parameters (e.g., color, line width, line style, text typeface) of the replacement pattern in addition to its shape. Thus, it will be understood that a graphical search and replace technique is a "user-friendly" framework for supporting the creation of recursive shapes, template shapes, and graphical macros.

Others have developed pattern recognition algorithms that could be employed for finding occurences of user-specified geometric shapes in digital images. Some of these algorithms are suitable for carrying out the search phase of a graphical search and replace operation. However, algorithms that are optimized for finding pattern matches in images produced by digital graphics editors are preferred. For example, the algorithm advantageously is optimized for quickly determining whether two curves have the same shape or not by determining whether they are composed of the same ordered set of segments or not. It also desireably is optimized to provide a single pass, deterministic procedure for finding all occurrences of a given graphical search pattern in a predefined synthetic graphics scene, file or database.

SUMMARY OF THE INVENTION

In accordance with the present invention, a graphical search procedure utilizes graphical pattern matching for finding occurrences of user-specified object shapes and other graphical properties in synthetic digital images. An interactive digital picture editor, such as a computer-resident illustration system or drafting system or a CAD system, may employ such a search procedure in combination with a replace procedure to implement a graphical search and replace function, whereby all or selected ones of the pattern matches found during such a search are modified in accordance with the shape and/or graphical properties of a user-specified replacement pattern that is spatially registered with the user-specified search pattern. Algorithms are provided for performing a single-pass directed search for graphical pattern matches existing within a single scene, single file or multiple file graphical database and for discriminating between objects preexisting within the database and objects added to it as replacements, thereby preventing the replacement objects from being matched and replaced. Therefore, these algorithms support, for example, a ChangeAll operation for finding and replacing all objects which match a given search pattern because the algorithms are deterministic and will always terminate.

BRIEF DESCRIPTION OF THE DRAWINGS

Further features and advantages of this invention will become apparent when the following detailed description is read in conjunction with the attached drawings, in which:

FIGS. 8A-8F illustrate different granularities of the search process;

FIGS. 9A-9C illustrate an exception to the usual directed search order;

FIGS. 10A and 10B illustrate another exception to the usual directed search order;

FIGS. 11A-11C illustrate the affect of the curve type and shape search parameters;

FIGS. 12A and 12B illustrate the affect of the exact search parameters and of a search tolerance;

FIGS. 13A and 13B are examples of how geometric characteristics are graphical properties of graphic search and replace patterns combine to produce a resultant object.

FIGS. 20A and 20B illustrate the representational independence of polyline curve matching.

FIGS. 22A-22D illustrate a variety of possible lead curves for a graphical search;

DETAILED DESCRIPTION OF THE ILLUSTRATED EMBODIMENTS

While the invention will be described in some detail hereinbelow with reference to a specific embodiment, it is to be understood that there is no intent to limit it to that embodiment. On the contrary, the intent is to cover all modifications, alternatives and equivalents falling within the spirit and scope of the present invention as defined by the appended claims.

I. Overview

A. Operating Environment

Figure 1:
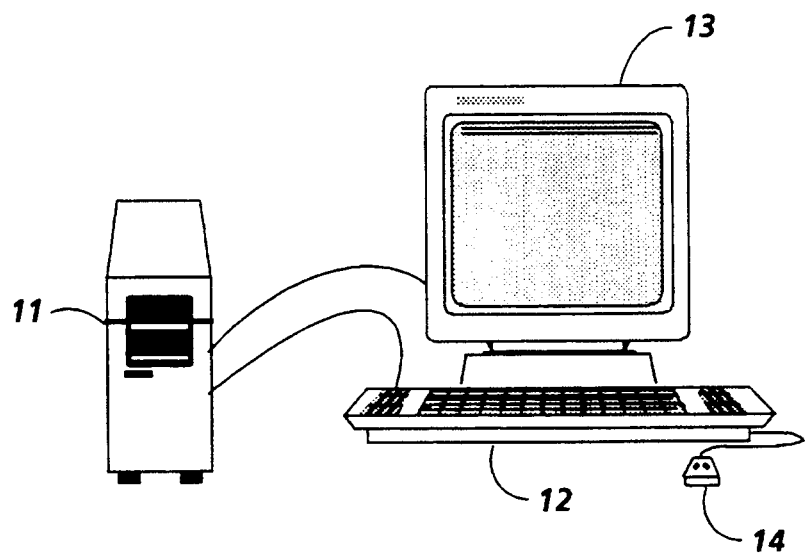
FIG. 1 schematically illustrates a personal workstation for running a synthetic graphics editor of the type with which the graphical search and replace utility of the present invention may be used to advantage.

An embodiment of the graphical search and replace utility that is provided by this invention has been implemented in a research software application program, known as MatchTool, which was written in the Cedar programming language using the Cedar programming environment (see D. Swinehart et al., "A Structural View of the Cedar Programming Environment," *ACM Transactions on Programming Languages and Systems*, Vol. 8, No. 4, October 1986, pp. 419-490) to run on a number of processors, including the Xerox Dorado high-performance personal workstation (see K. A. Pier, "A Retrospective on the Dorado, a High-Performance Personal Computer," *Proceedings of the 10th Symposium on Computer Architecture*, SIGARCH/IEEE, Stockholm, Sweden, June 1983, pp. 252-269). As shown in FIG. 1, such a workstation comprises a processor 11 which is interfaced with a keyboard 12, a monitor 13, and a cursor controller, such as a mouse pointer 14. MatchTool, in turn, cooperates with Gargoyle (see K. A. Pier et al., "An Introduction to Gargoyle: An Interactive Illustration Tool," in J. C. van Vliet, Editor, *Proceedings of the International Conference on Electronic Publishing Document Manipulation and Typography* (EP88), Nice, France, Apr. 1988, Camdridge University Press, pp. 223-238), which is based graphical editor for two-dimensional synthetic digital illustrations. Therefore, the above-identified publications are hereby incorporated by reference.

B. User Interface, Typical Applications and Options

1. Search and Replace for Geometric Shapes

Focusing first on the use of a graphical search and replace operation for making changes to an existing illustration, FIG. 2 shows that two windows 21 and 22 have been opened on the monitor 13. The first window 21 displays the illustration which is to be edited, while the second window 22 is divided into a pair of panes or subwindows 23 and 24 for displaying the user-specified search pattern and replacement pattern, respectively. The search and replacement patterns may be drawn in place or copied from suitable sources.

As shown in FIG. 2, the illustration which is to be edited is a read map in which the highway sign borders are represented as arcs, line segments and parametric curves, and the roadways are parametric curves. The text is represented as an ASCII string, with a given font name and an affine transformation. Recently, sections of Highway 17 have been renamed Interstate 880 near San Jose, Calif., so a search and replace operation is well suited for updating the map.

To perform such an update, a Highway 17 sign is placed in the search pane 23, such as by copying it from the map that is to be edited. Furthermore, an Interstate 880 sign is entered into the replace pane 24, either by drawing it in place or by copying it from some other existing illustration. Care is taken to ensure that the centers of both signs are at the same coordinates in their respective panes, so that no offset is introduced when replacements are performed. For example, their centers can be aligned easily by registering the centers of the two signs in the search pane 23 and by then moving the Interstate 280 sign into the replace pane 24 by employing a "move" operation that preserves coordinates.

Figure 2A:
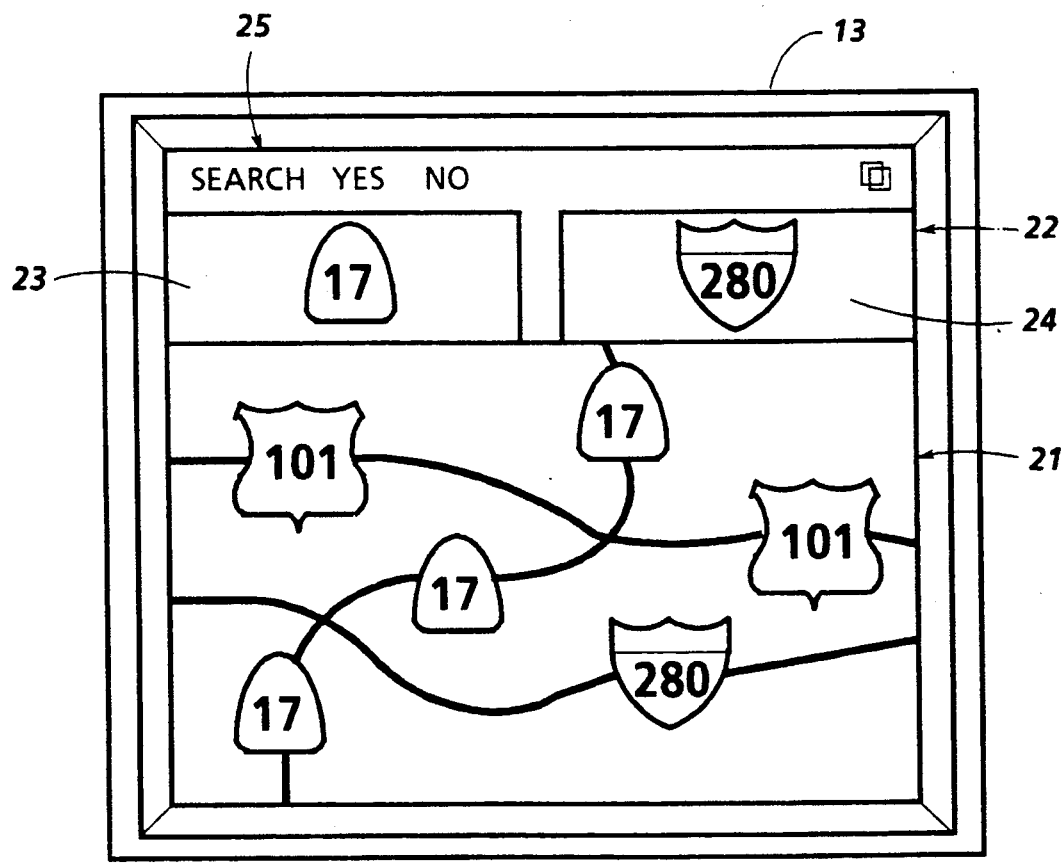
FIG. 2A shows the display windows that are opened by the workstation shown in FIG. 1 for performing a typical search and replace operation, as well as a suitable primary user interface for controlling that operation.
Figure 2B:
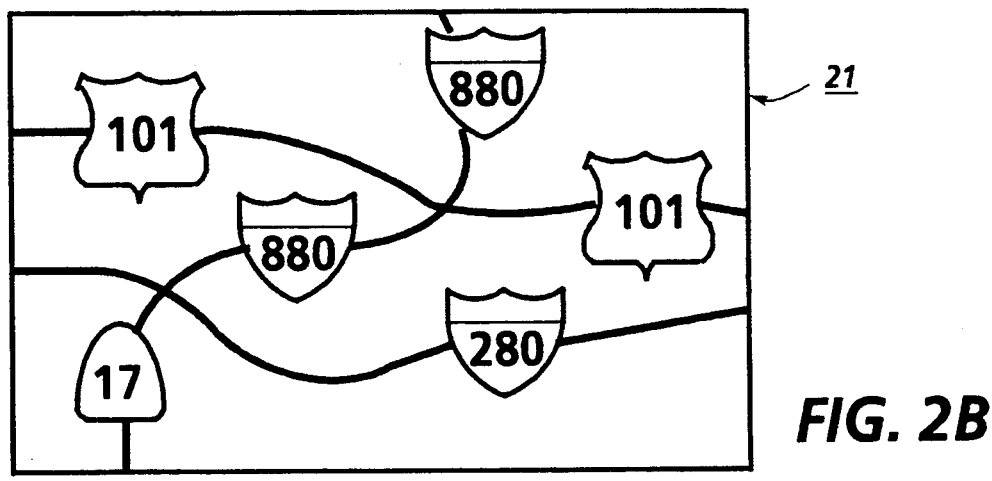
FIG. 2B shows the edited scene produced by performing the search and replace operation depicted in FIG. 2A.

A relatively simple menu 25 may be used as the primary user interface for controlling the basic search and replace actions: Search, Yes, No and ChangeAll. Selection of the Search option causes the illustration which is to be edited to be searched in a predetermined directed order, such as in top to bottom, left to right order, while searching for objects which match the Highway 17 sign search pattern. When a match is found, the matching pattern is selected to highlight it. If the Yes option is then selected, the existing Highway 17 is deleted, a Interstate 280 sign is substituted for it, and the search is re-initiated. Since Highway 17 has been renamed as Interstate 880 only north of Interstate 280, two search and replace cycles are sufficient to update this particular map. The third search phase finds a Highway 17 sign, but this sign is south of Interstate 280, so the No option is selected to override the replacement phase of this third cycle. The search then continues to conclusion, but no further matches are found, so that the user is notified that no furlther matches were found and the process then terminates. FIG. 2B shows the updated map. Of course, had it been desired to change all of the Highway 17 signs to Interstate 280 signs, the ChangeAll option could have been selected.

Figure 3:
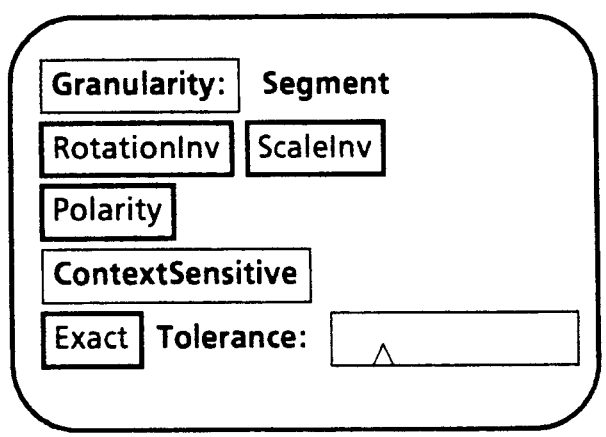
FIG. 3 illustrates a user interface for setting the geometric parameters for a search.

The foregoing demonstrates search and replace as applied to a collection of objects of known size, shape and orientation. However, it is to be understood that less restrictive searches an be achieved by varying one or more of six search parameters—Granularity, Rotation Invariance, Scale Invariance, Polarity, Context Sensitivity, and Tolerance. A user interface for these features is shown in FIG. 3. The first four of these parameters will be discussed in this section but the discussion of the last two will be found in the section on advanced search and replace operations.

Granularity may take on the values "cluster", "curve", or "segment". It tells the search and replace utility how much of the structure of the illustration may be ignored when performing matches. If Granularity is set to "cluster", then a group of curves that have been clustered in the illustration being edited will only match a similar complete cluster in the search pattern; i.e., the individual curves in the cluster cannot match separately. At the "curve" Granularity, a curve A in the illustration will match a similar curve B in the search pattern, even if A is part of a cluster. At this granularity, A must be matched in entirety, so a pattern containing only a subset of A's parts will not match. At the "segment" granularity, parts of a curve A may be matched by a pattern curve B, if all of B's parts match corresponding parts in A. At this granularity, an entire curve in the search pane 23 (FIG. 2A) can match a portion of a single curve in the scene to be edited.

In a "segment" match, the lowest-level scene elements (i.e., segments) are treated as atomic, so it is impossible to match on parts of them. This has performance benefits, and avoids other problems inherent in replacing portions of particular object classes. For example, it is impossible to replace portions of some segment types, such as non-local splines, without potentially causing changes to the entire segment.

When Rotation Invariance is turned on, the pattern matches a configuration of scene objects if some combination of translation and rotation will bring the search pattern and the scene configuration into correspondence. If more than one rotation is possible, the search utility will choose the smallest rotation that works. When Scale Invariance is turned on, the pattern matches a configuration of scene objects if some combination of translation and scaling will bring the pattern and configuration into correspondence. Likewise, when both Rotation Invariance and Scale Invariance are on, the search utility will try to use combinations of translation, rotation, and scaling to bring the search pattern into correspondence with the scene objects.

When Polarity is on, two curves will match only if they were drawn in the same direction. For instance, if a rotation-invariant match is performed where the pattern is a straight line segment, the pattern will match any straight line segment that has the same length as the pattern. With Polarity off, each match can be made with two rotations, differing by 180 degrees. With Polarity on, the search utility will take into account the direction in which each line segment was drawn, and will choose the rotation that aligns the search pattern segment with the scene segment.

Figure 4A:
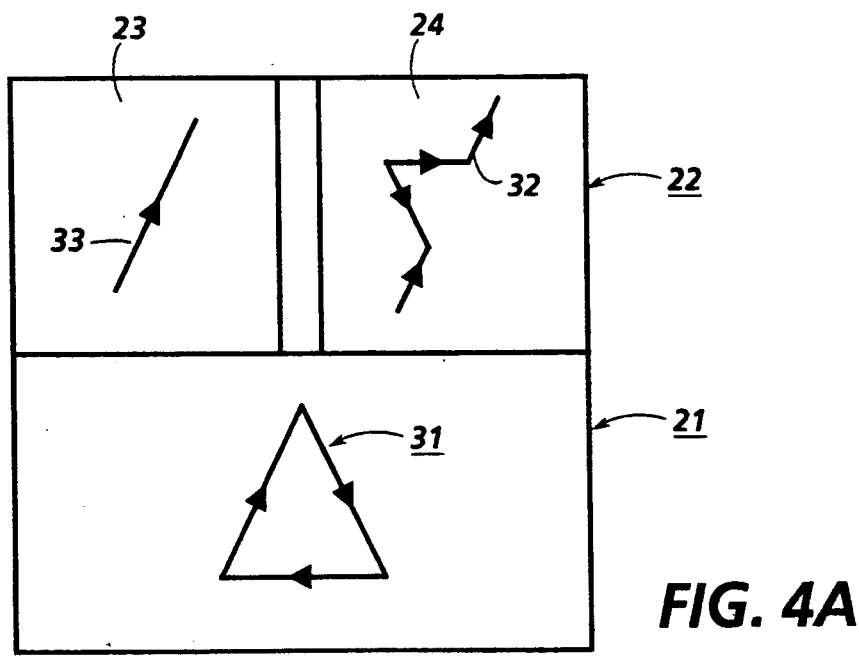
FIGS. 4A-4C illustrate a use of a recursive graphical search and replace function to generate a recurrent geometric shape.

The user controllable search parameters of FIG. 3 can be employed, for example, to construct a triadic Koch snowflake. To accomplish that, an equilateral triangle 31 is constructed by drawing its line segments in clockwise order as shown in FIG. 4A. Next, one edge of the triangle 31 is selected and copied into the search pane 23. In the replace pane 24, four line segments are drawn, each of them being ⅓ the length of the segment length used to construct the triangle 31. These line segments are drawn in the same direction (lower left to upper right) as the segments of the triangle 31. Moreover care is taken to ensure that the replacement shape 32 begins and ends at the same coordinates as the search segment 33, so that when scene objects are replaced, no offset will be introduced. The resulting search and replace panes 23 and 24 are shown in FIG. 4A.

Figure 4B:
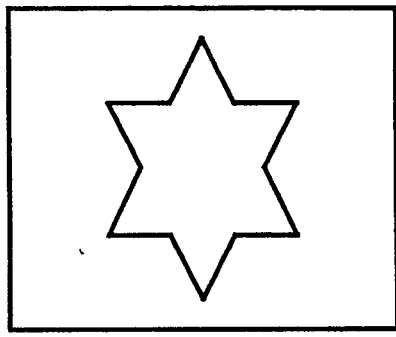
Figure 4C:
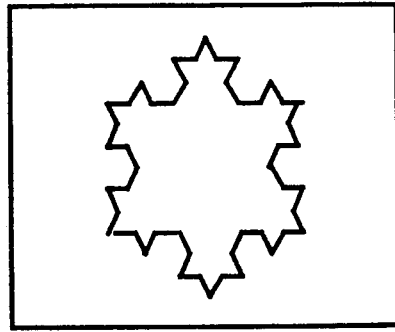

Now to recursively construct such a snowflake, the Granularity is set at "segment" so that the search can find individual segments of the original triangle 31. Further Rotation Invariance and Polarity are turned on. ChangeAll is then selected, whereby all of the line segments in the original triangle 31 are replaced by four-segment paths as shown in FIG. 4B. If ChangeAll again is selected, nothing happens, because the picture no longer contains any segments that are the same length as the pattern segment. But if Scale Invariance is turned on and ChangeAll is again selected, all of the segments of FIG. 4 are replaced by four-segment paths to produce FIG. 4C.

2. Search and Replace for Graphical Style

Figure 5:
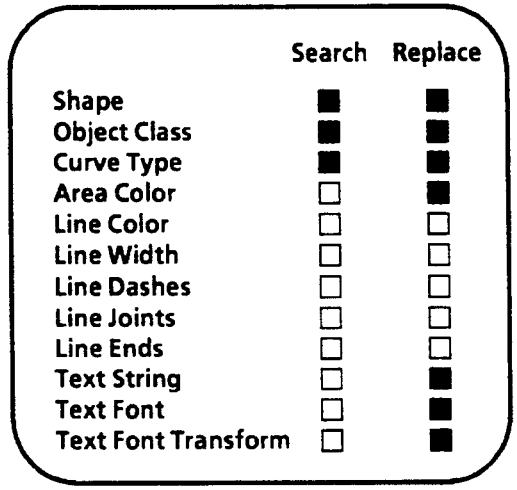
FIG. 5 illustrates a user interface for setting the graphical properties for the search and for the search and replace process.

It often is desirable to search for properties of graphical objects other than their shape (i.e., "graphical properties"), such as object class—box, circle, or polygon; curve type—line, Bezier, B-spline, conic, or arc; area color; line properties—line color, stroke width, dash pattern, joint blending, or stroke end shape; or text properties—ASCII string, font family, or font transformation. Likewise, a user may be interested in replacing graphical properties of the matched objects. FIG. 5 shows a portion of the user interface called the Search Column and the Replace Column. The black squares in the Search Column indicate those properties of the objects in the search pane 23 (FIG. 2A) that must agree with the scene objects for a match to succeed; other properties can be ignored. The black squares in the Replace Column indicate those graphical properties of the objects in the replace pane 24 that will be applied to the matched objects when a replacement is performed; other properties will be left alone, unless the specified properties indirectly force them to change (e.g., changing shape will change curve type). The user can toggle each graphical property to select or deselect it by clicking on the related selection box it with the mouse 14 (FIG. 1).

Figure 6A:
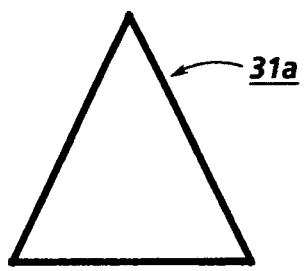
FIGS. 6A and 6B illustrate a typical application of a context sensitive graphical search and replace operation.
Figure 6B:
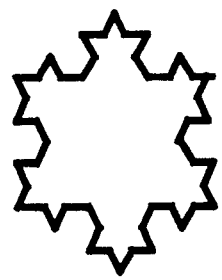

When the search and replacement properties are specified appropriately, the search and replace utility of the present invention can be used to change the shape of an object while leaving its color unchanged. For example, to make a multi-colored snowflake, the user might start with a triangle 31a as before while giving its three edges different colors, as shown in FIG. 6A. If Line Color is turned off in the Search Column, then all three edges will still match the pattern. Furthermore, if Line Color is turned off in the Replace Column, then as each edge is replaced, its color is applied to the replacement shape. If the same search pane and replace pane are used as before, then after two ChangeAlls, the picture of FIG. 6B is obtained. The search and replace utility can also change the color of an object while leaving its shape unchanged.

3. Advanced Search and Replace Features

Returning to FIG. 3, a context-sensitive search allows the user to search for the occurrence of a set of shapes, A, in the presence of another set of shapes, B. Only the shapes that match A are selected and eligible to be replaced. To perform a context-sensitive search, the user places all of the pattern shapes, A and B, in the search pane 23 (FIG. 2A) and indicates which shapes are in set A by selecting them. The user then turns Context Sensitivity on and initiates a search.

Context-sensitive search, by reducing the set of shapes that are eligible to be replaced, can remove ambiguities present in certain pattern specifications. For instance, if the Shapes property in the Replace Column (FIG. 5) is on, but the Line Color property is off, the search and replace process must replace the matched shapes with the replacement shapes, copying the line color of the matched shapes to the replacement shapes. A problem occurs if the search pattern matches a set of shapes that have several different line colors because it is uncertain which objects in the replacement pattern should receive which line colors from the match. Thus, to solve this problem, the user can break up the search into several context-sensitive searches, each of which will only select objects of a single line color.

Figure 7A:
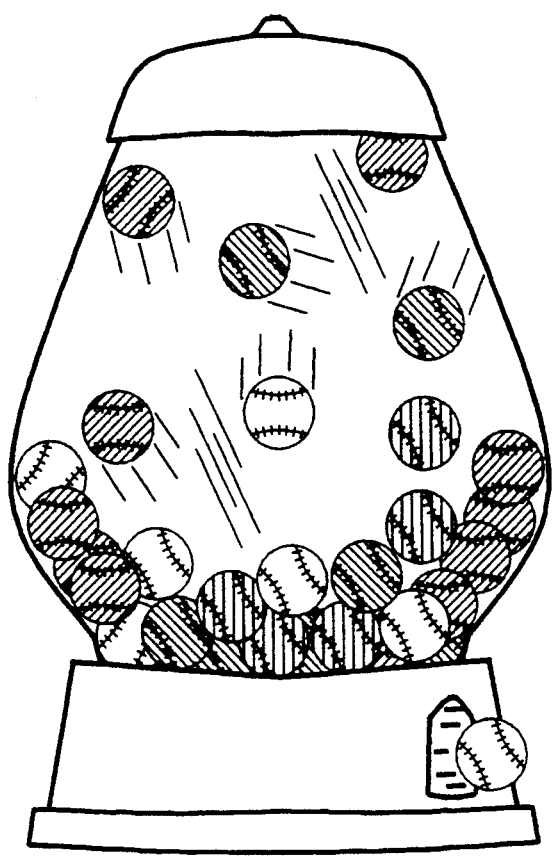
FIGS. 7A-7D illustrate another application of a context sensitive search and replace operation.
Figure 7C:
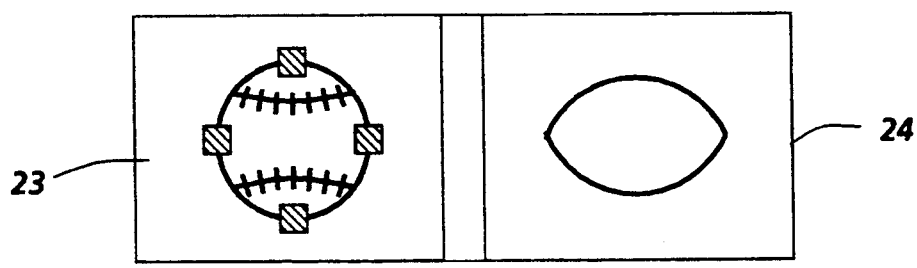
Figure 7B:
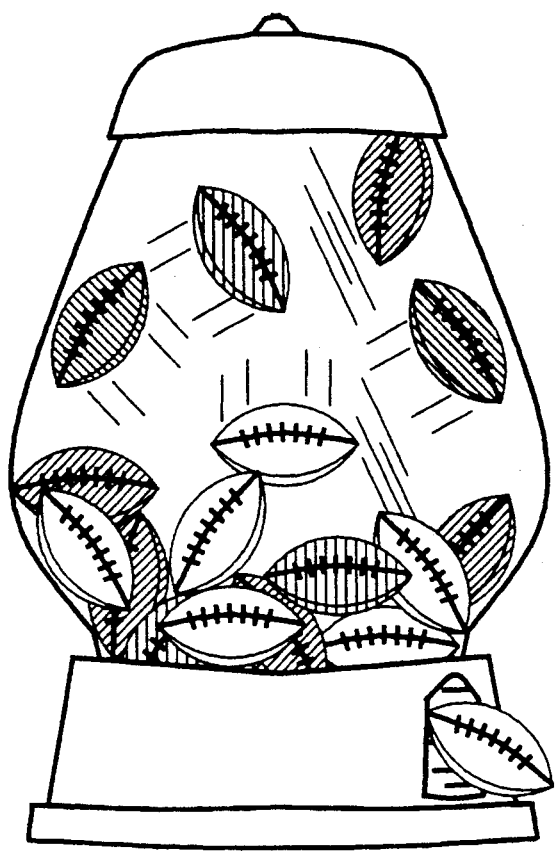
Figure 7D:
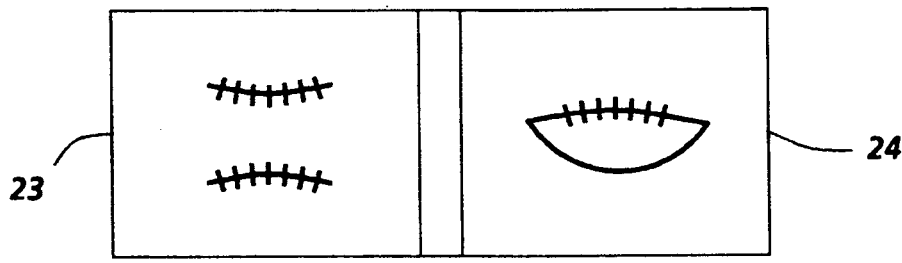

FIGS. 7A-7D give an example of another use of a context-sensitive search. The user starts with a picture of a gumball machine containing softballs (FIG. 7A) and replaces the softballs by footballs (FIG. 7B). Each football will take its orientation from the stitching direction of the softball it replaces and will take its area color and the line color of its stitching therefrom as well. Because the line color of the stitching and the line color of the outer circle are different in a single softball, this replacement cannot be performed all at once. Instead, the user performs one context-sensitive search and replace operation and one regular search and replace operation, as indicated in FIGS. 7C and 7D, respectively, to get the desired result as shown in FIG. 7B. The first operation (FIG. 7C) replaces circles (in the presence of softball stitching) by footballs with the proper orientation, area color and line color. The second operation (FIG. 7D) replaces the softball stitching by football stitching with the proper line color.

Variable error tolerance (FIG. 3), in turn allows the user to find shapes that match the search pattern approximately, but not exactly. By adjusting a software slider or the like (not shown) the user can increase or decrease the amount of error that the matching algorithms will permit when identifying matches. For example, an appropriate tolerance and search pattern would enable matches of all shapes that approximate circles or all shapes that approximate straight lines. To successfully use this feature, the user usually must understand some of the details of the shape matching mechanism, because appropriate tolerance generally is determined by trial and error.

4. Graphical Search and Graphical Macros

Once graphical search as been used to find graphical shapes, there are three actions that can be taken. Specifically, matched shapes can be replaced by new shapes, control may be turned over to the user to edit the matched shapes, or a set of editing operations that are specified by the user before searching begins can be performed. This last action involves so-called "graphical Macros". The user records a macro by performing a set of drawing operations in the replace pane 24 (FIG. 2A), while all of the mouse coordinates and button clicks are being recorded. The user then commands the search and replace utility to perform the macro instead of doing replacements and invokes one of the replacement operations (e.g., ChangeAll). Whenever a match is found while a macro is being performed, the search and replace plays back the recorded actions, transforming the mouse coordinates by the same transformation that would have been applied to replacement objects if a replacement were being performed. To prevent unexpected results, the macro commands are restricted to operate only on matched objects.

Graphical macros can be used to perform coherent changes that would be difficult with simple replacement. For instance, a set of objects can be given "drop shadows" by recording a macro that copies a matched object, colors the copy grey, offsets the copy from the matched object, and moves the copy underneath the original matched object.

II. Foundations of Search and Replace

This section provides a more formal description of what is meant by a synthetic graphical scene, describes how searches can be performed at finer grain or coarser grain, carefully motivates and describes a suitably modified top-to-bottom, left-to-right search order, describes the mathematical representations of curves and how these affect the search process, describes the difference between exact and inexact curve shape matching, and describes the difference between replacing shapes and replacing graphical properties.

A. Synthetic Graphical Scenes

The graphical search and replace algorithms described hereinbelow are intended to search for graphical objects in synthetic graphical scenes. In particular, the scene may be composed of a set of synthetic graphical objects, which in turn are composed of a set of disjoint curves, which in turn are composed of an ordered set of segments.

For instance, FIG. 8A shows one kind of graphical object, called an outline. An outline consists of an outer curve, 41, called a fence, and zero or more inner curves, 42, called holes. If the fence 41 does not close on itself (i.e., if it has two identifiable ends) then the outline will have no holes 42. As will be seen, the outline in FIG. 8A consists of two curves, one fence 41 and one hole 42. A curve is a single connected curved line. Intuitively, a curve is a curved line of the sort that could be drawn with a pen without lifting the pen from the paper. In many digital picture systems, curves are mathematically represented as an ordered sequence of pieces, called "segments", where each piece has a familiar mathematical form. For instance, the fence 41 of the outline in FIG. 8A consists of three segments, an arc 43, a line 44, and a parametric cubic curve 45 as shown in FIG. 8B. Likewise, as shown in FIG. 8C, the hole 42 is represented as two arcs 46 and 47.

Outlines are just one example of the sort of graphical objects that can be found using graphical search and replace. In general, for the purposes of this disclosure, a graphical object may be any collection of curves, whether or not they are thought of as fences and holes. In this disclosure, a graphical object, when thought of as a collection of curves, is called a cluster, or simply an object.

B. Granularity

The user may specify how much the search process is allowed to "pull apart" the graphical scene in order to find the objects in the search pattern. In particular, the user may search at the cluster level, the curve level, or the segment level.

When the user searches at the cluster level, clusters in the scene can only be matched in entirety. For example, if the outline of FIG. 8A is present in the scene, and a search is being performed with Rotation Invariance and Scale Invariance turned on, then the search pattern of FIG. 8D will match the scene outline. However, the search patterns of FIGS. 8E and 8F will not match, because these patterns contain only some of the parts of the outline of FIG. 8A.

When, however, the user searches at the curve level, then curves in the scene can only be matched in entirety, but the search does not care what cluster each curve belongs to. At this level, the search pattern of FIG. 8D will match both curves of the outline of FIG. 8A. Similarly, FIG. 8E will now match the outer curve of the FIG. 8A outline. However, the search pattern of FIG. 8F will still fail to match, because it represents only part of one of the curves of FIG. 8A.

Finally, at the segment level, all of the search patterns of FIGS. 8D–8F will match (all or part of) the outline of FIG. 8A. Specifically, the pattern of FIG. 8D matches the entire outline, the pattern of FIG. 8E matches the outer curve of the outline, and the pattern of FIG. 8F matches two of the segments of the outer curve of the outline shown in FIG. 8A.

Depending on which of these three granularities the user has chosen for a search, the search and replace utility builds different data structures with which to compare shapes. In general, the data structures are simpler for cluster level searches than for curve level, and simpler for curve level searches than for segment level searches. Of course, the search tends to proceed more rapidly when simpler data structures are used. These data structures and their construction will be discussed further hereinbelow.

For convenience, the notations "granularity=cluster" will be used herein to indicate that the user is searching at the cluster level, "granularity=curve" to indicate that the user is searching at the curve level, and "granularity=segment" to indicate that the user is searching at the segment level.

C. Bounding Boxes

Before beginning a search, the search tool computes, for each curve or group of curves in the scene, a rectangle which (1) has horizontal and vertical sides, (2) completely contains the particular scene curve or group of curves, and (3) is the smallest rectangle that satisfies conditions (1) and (2) above.

As will be seen, these rectangles, called bounding boxes, are used to determine the order in which curves will be searched and to quickly rule out curves that could not possibly match a given search curve under a predefined transformation.

D. Search Order

As a general rule, the scene of interest suitably is searched in top-to-bottom, left-to-right order when the user has requested a forward search, and in bottom-to-top, right-to-left order when the user has requested a reverse search. However, there are two significant exceptions to this rule.

1. Exception 1: The Lead Object

The search process chooses one of the clusters or curves of the search pattern to be the lead object, as described in more detail hereinbelow. During a search, the lead object is matched against scene objects in strict top-to-bottom, left-to-right order. However, if the search pattern contains one or more objects in addition to the lead object, and if search operations are performed repeatedly, it is possible for one search operation to match a set of scene objects whose bounding box is nearer the top of the window than the set of scene objects matched during a previous search operation. In other words, a sequence of matches may appear to move in a bottom-to-top direction at some times, even though the trend is generally top-to-bottom.

FIGS. 9A–9C illustrates one such situation. More particularly FIG. 9A shows a search pattern that is being used for a rotation invariant search. FIG. 9B shows a graphical scene in which a first match has been found, with the matched objects being highlighted by having black squares applied to their corners. FIG. 9C shows the same graphical scene in which a second match has been found. Note that although the lead object of the search pattern, the three-segment curve 48 in FIG. 9A, matches a lower object in FIG. 9C than in FIG. 9B, the match in FIG. 9C is higher when taken as a whole. This exception to the usual top-to-bottom, left-to-right search order is tolerated because it permits a relatively simple search strategy.

2. Exception 2: Ordering Within a Curve

The segments within a curve have a natural ordering determined by the temporal order that they would have if they had all been drawn with a pen, without lifting the pen from the paper. Thus, when the segments of the lead object of the search pattern are compared to the segments of a scene curve, the scene curve segments are considered in this natural order, rather than in a strict top to bottom order.

FIGS. 10A and 10B illustrate one motivation for this exception to the top-to-bottom search rule. As will be seen, FIG. 10A shows a search pattern consisting of two segments 49 and 50 that make a 120 degree angle. FIG. 9B, in turn, shows two curves, all of whose segments meet at 120 degree angles. Thus, the search pattern of FIG. 10A will match any adjacent pair of segments in FIG. 10B when rotation invariance is on. However, because the search rule specifies that a given segment can only be matched once, the search order determines which adjacent segment pairs will actually be matched. If a strict top-to-bottom rule were followed 51 and 52 of FIG. 10B would be matched first, then 53 and 54, and then 56 and 57. In other words, the process would match twice on the right hand curve but only once on the left hand curve! In contrast, if the segments are matched in their natural order, then the process will match segments 51 and 52 then 56 and 57, then 58 and 53, then 54 and 59.

There is another motivation for using the natural segment order. If the display 13 (FIG. 1) is updated after each substitution is made, then, in general, it will be necessary to reposition the graphical scene on the display so that the region where each substitution takes place is visible. If this is done, then using natural segment order can reduce the number of times that the entire graphical scene needs to be repositioned. This is easier on the user's eyes and saves computing time.

If the user requests a reverse (bottom-to-top) search just after a successful forward (top-to-bottom) search, and if the previous search matched the lead curve to a segment in the middle of a scene curve, the search process will begin the reverse search with that segment of this scene curve that was most recently visited in the forward search and will then proceed backwards through the segments. For instance, in FIG. 10B, if the process had just matched segments 54 and 59, it would go back and match segments 58 and 53. A second reverse search would find segments 56 and 57, and so on.

As will be seen, this natural order exception to the top-to-bottom rule complicates the search algorithm. However, it provides more intuitively predictable results.

E. Partial Scene Searches with a Caret

When the user manually places the software cursor, called the "caret", of the aforementioned Gargoyle illustrator, and then begins a forward search operation, only those clusters (or curves, depending on the search granularity) whose bounding boxes fall entirely below the caret are eligible to be matched. By contrast, if the user places the caret and begins a reverse search, only those clusters or curves which have the top of their bounding boxes above the caret are eligible to be matched. The slight asymmetry in this rule ensures that if the caret is placed at a given position ($x_0$, $y_0$) and forward searches are performed until no more matches are found, and then the caret is placed at the same position ($x_0$, $y_0$) and reverse searches are performed until no more matches are found, that all matches in the scene will be found.

After each match is found, the caret is moved to the upper left hand corner of the bounding box of the scene object that matched the lead object of the search pattern. Thus, the match that is found each time a search operation is invoked is always the first match beyond the caret in the search direction (subject to the exceptions to the search order rules discussed hereinabove).

F. Curve Type

All synthetic graphics editors internally represent curves mathematically. Usually, in the mathematical description, a single curve is represented as a sequence of curved segments (pieces), each of which is mathematically simple. For instance, FIGS. 11A and 11B shows a curve that has been represented by three pieces: a circular arc, a straight line segment, and a Bezier cubic curve. However, this representation is not necessarily unique. For instance, FIG. 11C shows another representation for the curve of FIG. 11A. This second representation is made of three circular arcs, a degenerate Bezier cubic curve, and a cubic B-spline curve. These curves of FIGS. 11A and 11C have exactly the same shape, but very different representations.

When the user activates the curve type search parameter (FIG. 5), then the search process will only allow matches between curves that have the same representation. For instance, a search based on the curve shown in FIG. 11A performed with scale invariance, rotation invariance and curve type all activated will match FIG. 11B but will not match FIG. 11C. In fact, if the curve type parameter is on, but the shape parameter is off, the curve of FIG. 11A will match any curve that is made of an arc, followed by a line, followed by a cubic, regardless of the actual shape of the pieces.

On the other hand, if the curve type search parameter is off and the shape search parameter is on, then the search pattern of FIG. 11A will match the curves of both FIG. 11B and FIG. 11C. An algorithm that determines whether or not two curves have the same shape, independent of their representations, is discussed hereinbelow.

G. Inexact Matches

The search process is normally used to find graphical objects that have exactly the same shape as the object in the search pattern (where a slight difference in shape is permitted to allow for errors in floating point computations). The user activates the Exact option (FIG. 3) to request this type of match. However, it is sometimes useful to search for objects that are only approximately the same shape as the search pattern. For instance, to find a circle, like the one in FIG. 12A, the user might sketch an approximately circular shape, like the one in FIG. 12B, and search for shapes that are nearly, but not exactly, the same shape as the sketch. This can be done by turning off the Exact option and choosing a tolerance value (a real number between zero and infinity). The larger the tolerance number, the more likely it is that the process will match the search pattern to a given object in the scene. Of course, with an excessively large tolerance value, all objects in the scene will be matched. As will be seen, one of the curve matching algorithms described hereinbelow allows for inexact matching.

H. Replacing Graphical Shapes and Properties

As previously pointed out, a search and replace operation can be used to change just the color of objects, just the shape of objects, or a combination of their geometric characteristics and their graphical properties. This means that the replacement algorithm must be able to combine shapes and properties from the matched objects and from the replacement pattern in order to form the final shapes that will appear in the graphical scene after the replacement operation is finished. For example, FIG. 13A depicts a situation where the search pattern (not shown) has matched a triangle 60a in the scene. As a replacement pattern 60b, the user has drawn a grey square with a thick border. The Replace Column 60c indicates that shape should be replaced, but its area color and line width should not. Thus, to compose the resultant object 60d, the replacement algorithm must take the shape from the replacement pattern 60b (highlighted with an arrow) and combines it with the area color and line width of the matched object 60a. Referring to FIG. 13B for still another example, it will be seen that the result shape is composed in a very different manner. Again, a triangle 60a has been matched, and the replacement pattern 60b is a thick-bordered grey square. However, the Replace Column 60e indicates that shape should be left alone, but the area color and line width should be replaced. Accordingly, to compose the resultant object 60f, the replacement algorithm takes the shape from the matched object 60a (highlighted with an arrow), and applies to this shape to the area color and line width of the replacement pattern 60b. As will be appreciated, still other combinations are possible. For instance, it is common to turn on shape, area color, and line width in the Replace Column. In this case, both shape and these other properties are taken from the replacement pattern.

Figure 14:
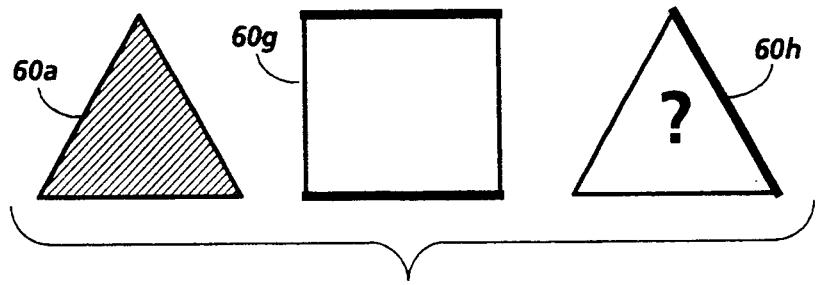
FIG. 14 is an example of a replace function which fails because of an ambiguity.

Unfortunately, if properties are to be transferred from an object that has multiple values for the same property, then the replacement operation becomes ambiguous. For example, FIG. 14 shows a situation similar to the one in FIG. 13B. Again, a triangle 60a has been matched. The replacement column 60e indicates that it is to keep its shape, but its area color and line width are to come from the replacement pattern 60g. Unfortunately, the replacement pattern 60g has several line widths, so is uncertain which edges of the triangle 60a should receive which line widths. When this situation occurs, the replacement operation is ambiguous, as indicated at 60h, so no replacement is performed but the user is advised that an error has occurred.

III. Curve Matching

The lowest level routines in the graphical search process of the present invention are the routines that compare two curves to determine whether or not they are the same shape. This comparison of two curves is called curve matching. Algorithms for curve matching are discussed in this section. Since graphical patterns will, in general, have many curves and will describe graphical properties other than shape, such as color and line width, a general-purpose search process that relies on curve matching as a subroutine has also been implemented. This more general facility is described in the next section of this disclosure.

The preferred curve matching algorithms rely on two techniques to achieve efficiency:

1. Quick Reject Tests. Before making a detailed comparison of the two curves, some quick checks are performed to determine if the curves are obviously not of the same shape. The shapes of the two curves are compared in detail only if they pass these quick checks.

2. Canonical forms. The shape of each curve in the scene and each curve in the search pattern is represented in a standard form, called its "canonical form". If a rotation invariant search is performed, this canonical form will be the same regardless of how the shape was originally rotated; and if scale-invariant search is performed, it will be the same regardless of how the shape was originally sized. Once these canonical forms have been computed, curves can be compared without requiring further computation to rotate or scale them. Even when it is necessary to determine whether a particular transformation maps a search curve to a scene curve, the transformation need only be applied to two points of the search curve to determine if a match occurs at that transformation, rather than transforming the entire search curve. Furthermore, the canonical form of an entire curve need only be computed once at the beginning of the search process.

Two approaches have been taken to the curve matching problem. In the first approach, which is called "structure-based" curve matching, two curves must be made of the same number of segments of the same type in order to match. However, the second approach, known as "polyline-based" matching, is able to discover that two curves have the same shape, even if they are represented by different numbers of segments, by different types of segments, or both. To provide this less restrictive matching capability, each curve is converted into a representation, called a "polyline", that depends only on the shape of each curve, not on the way in which it is represented. The polyline representations of the two curves are then compared to determine whether a match occurs.

A. Curve Matching

Given two curves, each represented as a sequence of segments, the goal is to compare the two curves to determine if they have the same representation, to determine if they have the same shape, or both. If the representations of the two curves must match, then structure-based curve matching is preferred. Otherwise, polyline-based matching is superior. This section first describes how both structure-based and polyline-based curve matching are performed. Next, it describes how to find the transformation from the search pattern curve to a matching scene curve. Finally, it describes how the curve matching algorithm is modified if the only goal is to match two curves using a particular affine transformation (i.e., using a certain combination of translation, rotation, and scaling operations).

1. Stucture-Based Curve Matching

Figure 15:
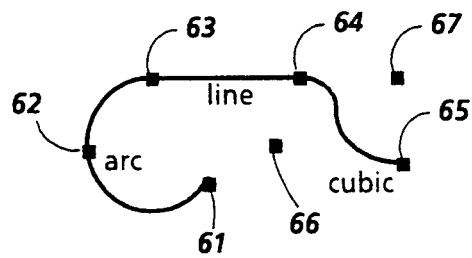
FIG. 15 illustrates the control points of the curve shown in FIG. 11A.

As a general rule mathematical formulations for curves express the shape of each curve segment in terms of the positions of two or more control points. FIG. 15 shows the curve of FIG. 11A, with the control points of each segment being depicted by black squares. As will be seen, the arc is defined as the unique circular arc that both passes through control points 61, 62 and 63 and ends at points 61 and 63. The line segment is the unique straight line segment that passes through control points 63 and 64, while bezier cubic curve ends at control points 64 and 65 and has its shape determined by control points 64–67.

When performing a structure-based comparison of two curves, it is first determined whether both curves contain the same number of segments. If they do not, then the match fails instantly. If the curves have the same number, n, of segments, then the process compares the type of the $i^{th}$ segment of the first curve with the type of the $i^{th}$ segment of the second curve, where i ranges from 1 to n. If any of these comparisons discovers that the types differ, the comparison of the curves instantly fails. If, however, the types are equivalent, then it is necessary to compare the shapes of the two curves.

Figure 16A:
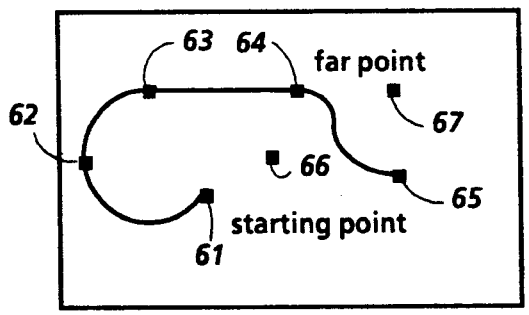
FIGS. 16A-16E illustrate the steps involved in computing structure based canonical forms of a curve.
Figure 16B:
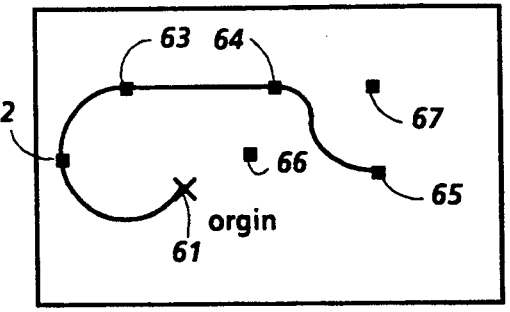
Figure 16C:
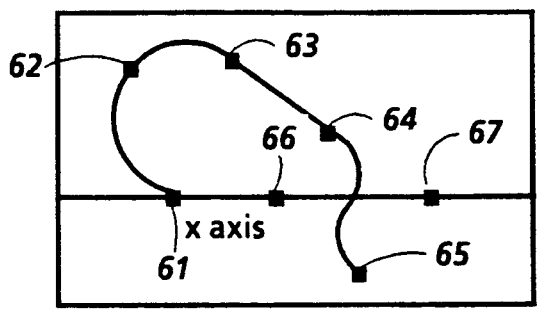
Figure 16D:
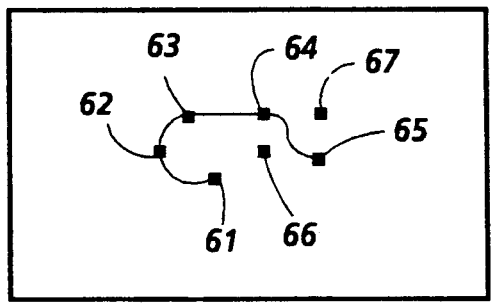
Figure 16E:
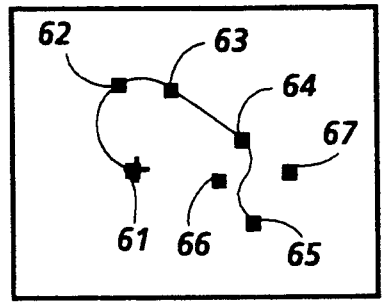

Because it is desired to be able to find curves whose shapes differ by a translation plus a rotation or a change of size, it is necessary to be able to factor out the effects of rotation and scaling. That requires computing a second representation for each curve that is independent of its position, orientation, and relative size. To compute this new representation, the original mathematical representation of the curve is modified as follows: First, the lowest-numbered control point of the curve (e.g., the starting point 61 in FIG. 16A) is found, and the curve is then translated so that this point is on the origin (i.e., at the point [x=0, y=0]), as shown in FIG. 16B. In addition, if a rotation-invariant search is to be performed, the control point 67 that is farthest from the lowest-numbered control point, call it the far point, is found, and the curve is rotated about the origin until the far point 67 is on the positive x axis (i.e., on the right hand side of the horizontal line that passes through the origin, as shown in FIG. 16C). Or if a scale-invariant search is to be performed, the curve is first translated as in FIG. 16B and then scaled about the origin until the far point 67 is at a distance of 1.0 units from the origin, as shown in FIG. 16D. Of course, if the search is both scale and rotation invariant, the rotational step of FIG. 16C and the scaling step of FIG. 16D are both performed, as shown in FIG. 16E.

The curve computed by the above process is called the "structure-based canonical form" of the original curve. Once a structure-based canonical form for each of two curves has been computed these curves can be compared by comparing their canonical forms. While making such a comparison, it is first determined whether the two canonical forms have the same number, p, of control points. If not, the comparison instantly fails. Otherwise, the positions of the $i^{th}$ control point of the first canonical form is compared with the position of the $i^{th}$ control point of the second canonical form, where i ranges from 1 to p. If each pair of control points has the same position (allowing for numerical imprecision), then the curves are said to match. Otherwise, the comparison fails.

2. Polyline-Based Curve Matching

Figure 17:
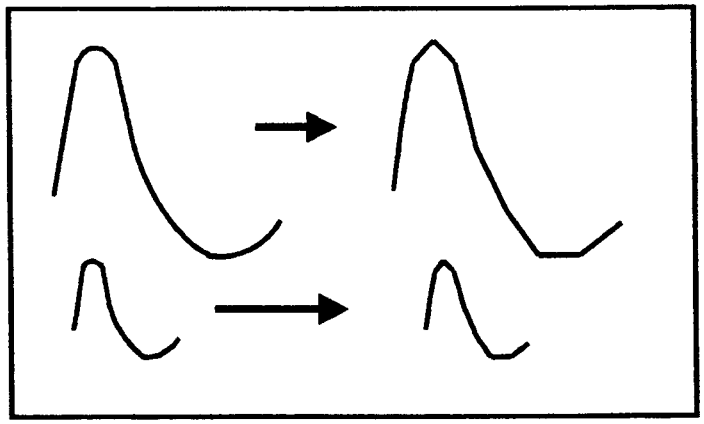
FIG. 17 illustrates a situation in which two different curves may yield similar polyline approximation.

A polyline-based comparison of two curves, requires the approximation of each curve by a piecewise linear path, known as a "polyline". Polyline approximations are constructed adaptively, so areas of high curvature are represented by more line segments than flatter areas. However, to keep polylines from having too many segments, the polyline segments preferably are constrained to be of at least a predetermined minimum length. Many graphics systems already perform this type of vectorization because it is a common step in rendering curves on a computer display. As shown in FIG. 17, the polylines for copies of a curve at different scales may not be scales of one another. The test for equality must allow for this error as more fully described hereinbelow.

Figure 18A:
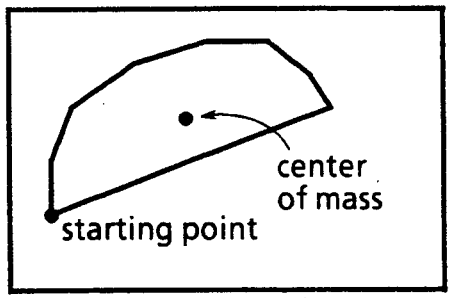
FIGS. 18A-18D illustrate the transformation of a polyline into its canonical forms.
Figure 18B:
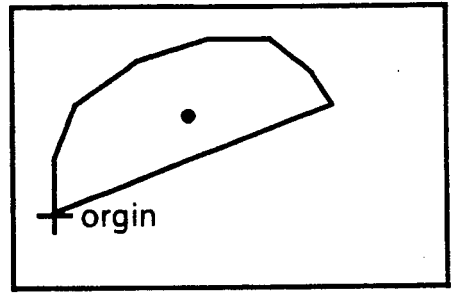
Figure 18C:
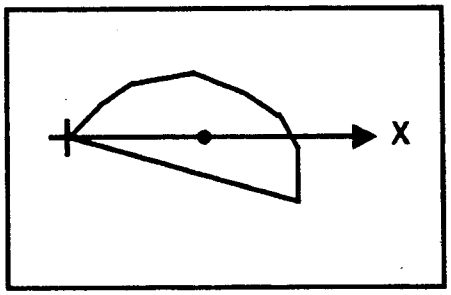
Figure 18D:
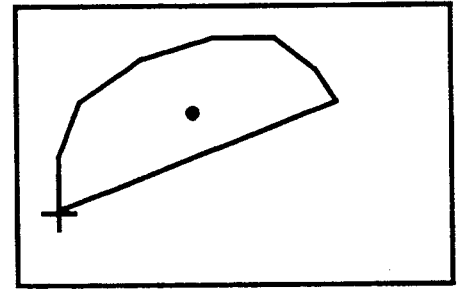

Polylines, such as shown in FIG. 18A, are transformed to a canonical form so that they can be quickly compared. The nature of the canonical form depends upon whether the match is to be rotation-invariant, scale-invariant, neither, or both, as shown in FIGS. 18B-18D, respectively. One point of the polyline is chosen as the starting point. For open curves, the first end point is used. For closed curves, the point of greatest distance from the center of mass of an "equivalent wire" of uniform density per unit length lying along the curve is used (FIG. 18A). Of course, closed curve may have several points farthest from the center of mass, in which case the curve will have several canonical positions. The polyline (FIG. 18A) is transformed so that its starting point lies at the origin FIG. 18B. If a rotation-invariant match is chosen, the polyline is rotated so that the center of mass lies along the positive x axis (FIG. 18C). If a scale-invariant match is desired, then the polyline of the curve is normalized to have a unit arc length (FIG. 18D). If the search is to be both scale and rotation invariant, then both of the last two steps are combined (not shown).

A set of quick-reject tests can now be applied to the polylines to avoid further computation on pairs of curves that obviously do not match. Several quantities, including arc length, the maximum distance from a curve to its center of mass, and the position of the center of mass relative to the starting point, can be compared quickly to make such a determination. If these values for two polylines differ by more than a minimal quantity (accounting for arithmetic imprecision or differences in quantization), then it is concluded, without further computation, that the curves do not match.

Figure 19:
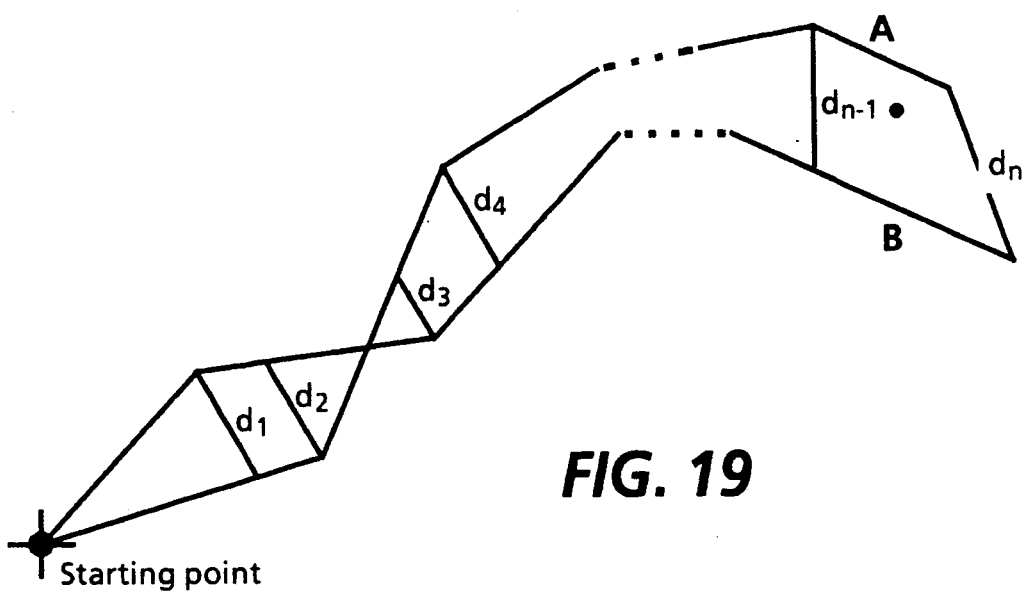
FIG. 19 illustrates a distance comparison curve matching test for comparing two polylines.

If the quick reject tests do not rule out the possibility that two given polylines, A and B, represent equivalent shapes, a more comprehensive comparison is required. To that end, for each vertex, v, of polyline A, a measurement is made along the polyline A to determine how far the vertex, v, is from the starting point of the polyline A. Call this measured distance w. Then, by beginning at the starting point of polyline B and advancing along it a distance w, a point p on polyline B is uniquely identified (point p may be in the middle of a line segment of polyline B). Next, the distance from vertex v to point p is computed. If this distance exceeds a certain threshold, for any vertex on polyline A, the match fails, so this threshold, as well as the quantities used in the quick-reject tests, can be adjusted to reflect a user-specified match tolerance. This relatively rigorous comparison process is repeated while swapping the roles of polyline A and polyline B. Thus, if all of the vertices of polyline A are sufficiently near polyline B as determined by the tolerance criterion and if all of the vertices of polyline B also are sufficiently near polyline A based on that same criterion, the match succeeds. Otherwise, the match fails. FIG. 19 illustrates the foregoing comparison process. As will be seen, each vertex of polyline A can be visialized as being connected by a short line segment to the point that is the same arc length along polyline B, and each vertex of polyline B can be visualized as being connected by a short line segment to the point that is the same arc length along polyline A. The distances $d_1, d_2, \ldots, d_n$ are computed by the polyline-based comparison algorithm. Each distance $d_i$ is examined to make sure that it is smaller than the user specified tolerance threshold.

It is important to note that the above-described distance comparison, together with the quick-reject tests, define the shape-matching criteria. In the case of inexact matches, it is possible for curves that would have passed the distance comparison test for equality to fail at least one of the initial quick-reject tests, and to therefore be considered unequal.

When comparing two closed curves with the distance comparison, every canonical orientation of one of the curves must be compared with a single canonical orientation of the other before declaring a mismatch, unless the arc length or maximum distance to center of mass tests indicate dthat such a comparison is not necessary. Although the polyline curve matching algorithm is linear in complexity with respect to the number, n, of samples in the polylines for all open and some closed curves, there are certain closed shapes that will slow it down to $O(n^2)$. Other representations such as sampling the distance of a curve from its centroid (see H.

Freeman, "Shape Description Via the Use of Initial Points," *Pattern Recognition*, Vol. 10, No. 3, 1978, pp. 159-166), or sampling the curve's curvature (see H. Wolfson, "On Curve Matching," Technical Report #256, Courant Institute of Mathematical Sciences, N.Y., N.Y., November 1986) can be used to improve this upper bound on the complexity of the curve matching algorithm.

FIGS. 20A and 20B show how polyline-based curve matching can find matching curves, even when the curves are represented differently. The curve on the left side of FIG. 20A has a different representation from the curve on the left side of FIG. 20B. However, as shown on the right-hand sides of these FIGS., the polylines produced from left-hand side curves pass through very nearly the same points. Thus the distance comparison will discover a shape match.

3. Computing the Matching Transformation

At this point it will be understood that when either a structure-based or a polyline-based matching algorithm is used, one or more canonical forms for each curve are derived by applying affine transformations, such as a translation (to align the starting point with the origin), rotation (to place the curve in one of its canonical orientations), and scaling (to shrink or enlarge the curve to a canonical size). All of these transformations and the order in which they are performed are recorded for use in computing a single affine transformation that maps the original curve onto its canonical form. This transformation is then stored with the canonical form for later use.

Once it has been determined that two curves, G and H, actually do match, the transformation that takes H to G can be computed as follows. If H matches G, then some canonical form of H, call it B, matches some canonical form of G, call it A. Since the transformation that takes H to B and the transformation that takes G to A are known, those two transformations can be used to compute the transformation that takes curve H to curve G. As will be appreciated, the computation of the H to G transform involves a forward application of the H to B transform and a backward or reverse application of the G to A transform.

4. Constrained Search

As more fully described below, once a match has been found for one of the objects in the search pattern (the lead object), the search process computes the transformation, T, that takes the lead search object into its matching scene object. This transformation is found as described in Section IIIA3 above. The process then tries to find out if all of the other curves in the search pattern can be matched to scene curves, using the same transformation, T. In other words, to match one of the other curves, H, in the search pattern, it is necessary to find a scene curve, G, such that T takes H into G.

To determine if a particular search curve H can be mapped by T into a particular scene curve G, it is preferred to first use the curve matching algorithms described above. If it is concluded that G and H do not match using those curve matching algorithm, then G and H will not match under transformation T either and the match fails. However, if G and H are matched based on those algorithms, then one additional test is performed as follows:

Two distinct points on each H curve are chosen, such as the starting point and the farthest point from the starting point. The transformation T is then applied to those two points of H. Thereafter, the transformed starting point of H, is compared to the starting point of G and the transformed farthest point of H is compared to the farthest point of G. If the points being compared are nearly the same in each case, then the match succeeds. Otherwise, the match fails. As will be appreciated, if the search process were extended to allow search pattern shapes to match skewed versions of themselves, it would be necessary to transform and compare three distinct points of H instead of just two as described above.

B. A Sample Flow Chart and Pseudo-Code for Curve Matching

1. A Flow Chart Illustration of Curve Matching

Figure 21:
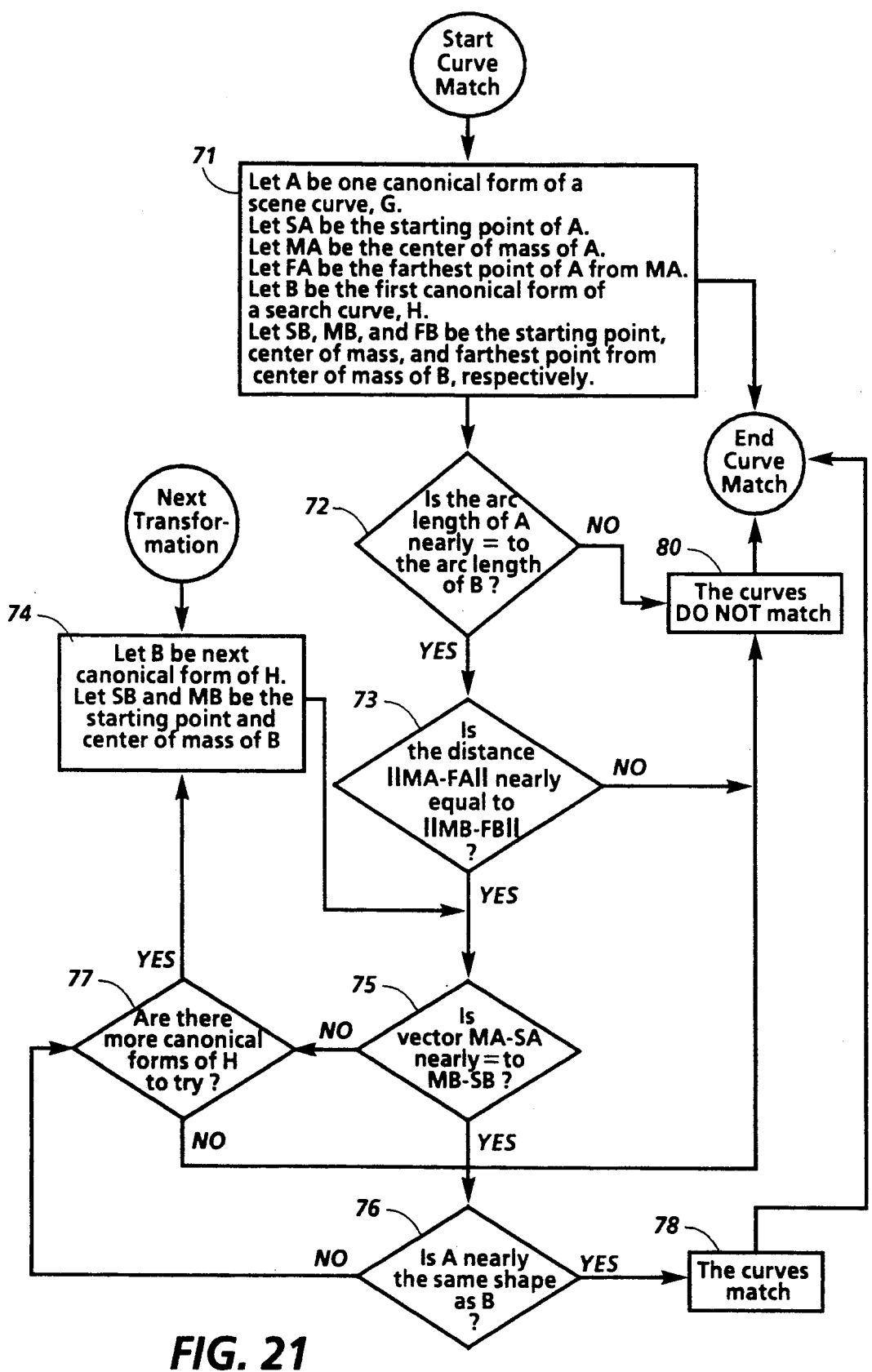
FIG. 21 is a simplified flow chart of the graphical search operation provided by this invention.
Figure 23:
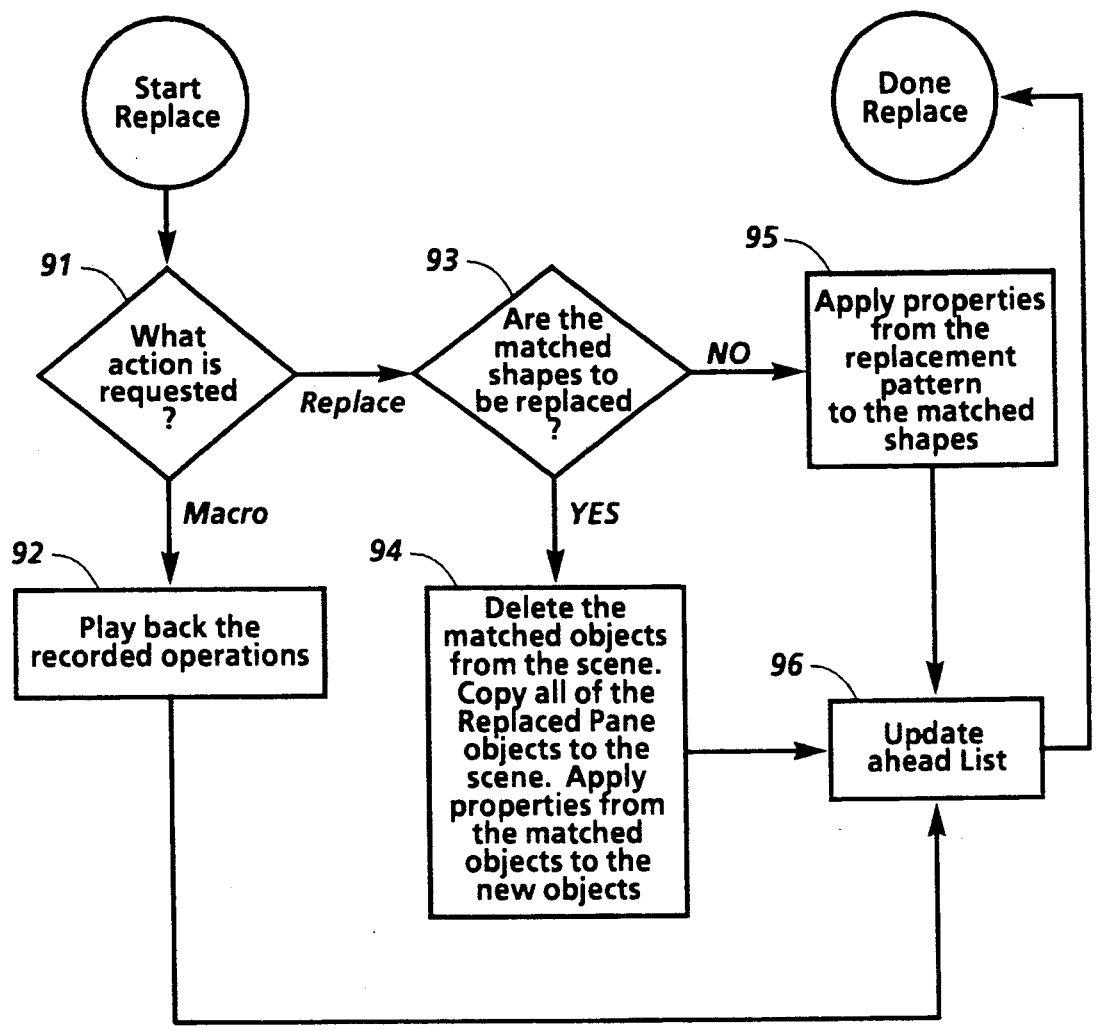
FIG. 23 is a simplified flow chart for a graphical macro execution/replace operation in accordance with this invention.

FIG. 21 shows the basic steps performed to carry out the curve matching algorithm for polyline-based matching. As indicated at 71, a scene curve G is being compared to a search pattern curve H. First, properties of the two curves that do not depend on which canonical orientation of curve H, such as arc length and the distance from the center of mass to the farthest point from the center of mass, are compared, as at 72 and 73. If these properties are very different, a report is promptly issued to the user that the curves do not match and the process is done. Otherwise, a particular canonical form of H, call it B, is chosen, as at 74, for comparison, as at 75 and 76, with a canonical orientation of curve G, call it A. More particularly, the vector from the center of mass of A to the starting point of A is first compared, as at 75, against the vector from the center of mass of B to the starting point of B. If these vectors are very different, then it is apparent that B does not match A, so the process turns to another canonical form of H if any others remain to be tried, as at 77, without rigorously comparing the shape of A to the shape of B. On the other hand, if A and B pass all of the preliminary tests, then the shape of A is compared to the shape of B, as at 76, using the distance comparison described above. If the polylines match, then G and H match, as at 78. Otherwise, the process continues, as at 77, based on another canonical form of H. If there are no more canonical forms of H to try, then G and H do not match, as indicated at 80.

The steps involved in carrying out the algorithm for structure-based curve matching are similar, except that for structure-based matching, (1) the farthest control point from the starting point is used in place of the center of mass, (2) the distance comparison 73 is replaced by a test to determine whether A and B have the same number of segments and the same number of control points, and (3) the arc length comparison 72 is replaced by a comparison of the cumulative length for each curve of the straight line segments required for connecting one after another of the control points of the curve to each other.

2. Pseudo-Code Description of Curve Matching

The following pseudo-code describes the curve-matching algorithm using three routines. As will be seen, the CompareCurveShape routine calls a StructureBasedCompare routine if the curve type search parameter is active, but otherwise calls a PolylineBasedCompare routine. The pseudocode has been expressed using the notation $\|X-Y\|_2$ to denote the Euclidean distance between point X and point Y, the pound sign, '#' to mean "is not equal to," and the notation "(G: Scene Curve, H: Search Pattern Curve)" following the word PROCEDURE to mean that the associated procedure has two parameters, G and H, where G is a scene curve and H is a search pattern curve. Throughout this disclosure, a left arrow ("←") is used as the assignment operator. Furthermore, text that appears in italics, whether in square brackets or following two dashes, is a comment.

Before turning to the pseudo-code, it is to be understood that the variable "positionD" is important for the searching algorithms that will be described hereinbelow. It is set by the StructureBasedCompare or PolylineBasedCompare routines but is not used by either of them. The transformations listed in positionD are computed as described in Section III. A3 above.

CompareCurveShape: PROCEDURE (G: Scene Curve, H: Search Pattern Curve) = {
    IF curve type is active in the Search Pane THEN { -- *use structure-based matching*
        CALL procedure StructureBasedCompare;
        RETURN the match StructureBasedCompare finds (if any);
    }
    ELSE { -- *use polyline-based mapping*
        CALL procedure PolylineBasedCompare;
        RETURN the match PolylineBasedCompare finds (if any);
    };
};

StructureBasedCompare: PROCEDURE (G: Scene Curve, H: Search Pattern Curve) = {
    IF G is not a complete curve THEN {
        Compute a structure-based canonical form for G;
        Store the canonical form in A;
    }
    ELSE A ← the canonical form for H that was computed during Initialization;
    Bset ← the canonical forms for H that were computed during Initialization;
    B ← the first element of Bset;
    IF the arc length of A ≠ the arc length of B THEN RETURN failure;
    IF the number of segments in A ≠ the number of segments in B THEN RETURN failure;
    IF the number of control points in A ≠ the number of control points in B THEN RETURN failure;
    $s_A$ ← the starting point of A;
    $f_A$ ← the farthest control point of A from $s_A$;
    $s_B$ ← the starting point of B;
    $f_B$ ← the farthest control point of B from $s_B$;
    TestB:
        IF the vector $f_A$-$s_A$ is noticeably different from $f_B$-$s_B$ THEN GOTO TryNextB;
        FOR all integers, i, from 1 to the number of control points in A DO
            Find the distance from the $i^{th}$ control point of A to the $i^{th}$ control point of B;

IF the distance is noticeably different from zero THEN GOTO TryNextB;
            END LOOP on i;
        IF positionD is empty (no transformation has currently been proposed) THEN {
            positionD ← a list of transformations consisting of the transformation that takes H to
              G, via the canonical forms B and A, plus the transformations that take H to G, via
              A and any canonical forms of H that we haven't ruled out yet;
        };
        RETURN success; -- *we have found a match*
    TryNextB:
        IF there are still elements of Bset that we haven't tried THEN {
            B ← the next element of Bset;
            $s_B$ ← the starting point of B;
            $f_B$ ← the farthest control point of B from $s_B$;
            GOTO TestB;
        }

ELSE RETURN failure; -- *there are no matches*
};

PolylineBasedCompare: PROCEDURE (G: Scene Curve, H: Search Pattern Curve) = {
   IF G is not a complete curve THEN {
      Compute a polyline-based canonical form for G;
      Store the canonical form in A;
   }
   ELSE A ← the canonical form for G that was computed during Initialization;
   Bset ← the canonical forms for H that were computed during Initialization;
   B ← the first element of Bset;
   IF the arc length of A ≠ the arc length of B THEN RETURN failure;
   $s_A$ ← the starting point of A;
   $m_A$ ← the center of mass of A;
   $f_A$ ← the farthest control point of A from $s_A$;
   $s_B$ ← the starting point of B;
   $m_B$ ← the center of mass of B;
   $f_B$ ← the farthest control point of B from $s_B$;

TestB:
   IF the vector $f_A$-$s_A$ is noticeably different from $f_B$-$s_B$ THEN GOTO TryNextB;
   IF the distance $\|m_A-s_A\|_2$ is noticeably different from $\|m_B-s_B\|_2$ THEN GOTO TryNextB;
   FOR all integers, i, from 1 to the number of vertices in A DO
      Find the "walking distance", w, from $s_A$ to the $i^{th}$ vertex of A;
      Find the point, p, on B that is at "walking distance" w from $s_B$.
      IF the distance from p to the $i^{th}$ vertex of A is greater than a tolerance
         THEN GOTO TryNextB;
   END LOOP on i;
   FOR all integers, i, from 1 to the number of vertices in B DO
      Find the "walking distance", w, from $s_B$ to the $i^{th}$ vertex of B;
      Find the point, p, on A that is at "walking distance" w from $s_A$.
      IF the distance from p to the $i^{th}$ vertex of B is greater than a tolerance
         THEN GOTO TryNextB;
   END LOOP on i;
   IF positionD is empty (no transformation has currently been proposed) THEN {
      positionD ← a list of transformations consisting of the transformation that takes H to
         G, via the canonical forms B and A, plus the transformations that take H to G, via
         A and any canonical forms of H that we haven't ruled out yet;
   };
   RETURN success; -- *we have found a match*

TryNextB:
   IF there are still elements of Bset that we haven't tried THEN {
      B ← the next element of Bset;
      $s_B$ ← the starting point of B;
      $m_B$ ← the center of mass of B;
      $f_B$ ← the farthest control point of B from $s_B$;
      GOTO TestB;
   }
   ELSE RETURN failure; -- *there are no matches*
};

IV. Efficient Search for Graphical Shapes and Properties

The graphical search and replace process of the present invention is capable of finding a collection of curves, all of which may have different graphical styles, such as fill colors, line colors, line widths, and dash patterns. Furthermore, if more than one collection of shapes matches the search pattern, the process reports these matches essentially in a top-to-bottom, left-to-right order. This section describes an algorithm for finding the "next" occurrence of a graphical pattern in a graphical scene, where the "next" occurrence follows the most recently matched occurrence in such a top-to-bottom, left-to-right order. This algorithm uses the following strategies to achieve good performance:

1) Query optimization. All of the information in the search pattern is sorted to identify those of its features that are either (i) computationally inexpensive to compare against shapes in the scene or (ii) most likely to quickly narrow down the number of scene objects that could possibly match the search pattern. These identified properties are compared first. In keeping with this optimization, one curve in the search pattern is chosen to be the so-called lead curve. The scene is first examined for this lead curve, before trying to match the other shapes in the search pattern.

2) Constrained search. Once a transformation, T, has been found that maps the lead curve to a scene curve, it is determined quickly whether the remainder of the objects of the search pattern match at that particular transformation by applying the transformation T to them, noting the positions of the resulting transformed objects and eliminating from consideration those scene objects that are far from the positions of these transformed objects.

A. A Search and Replace Algorithm

When the user single steps through the search and replace procedure by selecting the Yes option of the basic user interface (FIG. 2A) just once, as many as three computational phases are performed in the following order: initialization, search, and replace. When, however, the user repeatedly selects the Yes option without any intervening operations, the initialization phase is performed only once, while the search and replace phases are performed alternately, with the result that the phases are performed in the order: initialization, search, replace, search, replace, search, replace, etc. Likewise, when "ChangeAll" is selected, the system automatically runs through the three phases starting with the initialization phase and then alternating between the search and replace phases. When several searches and replaces are performed in this interleaved fashion, the process keeps track of all of the objects that have been found by all of the search phases since the most recent initialization, and does not allow any of them to be matched again. Furthermore, any objects added by the replace phases are not eligible to be found by the search phases until a new initialization is requested by the user. This ensures that ChangeAll has predictable results and will always terminate.

The operations performed during the three phases of the search and replace process are as follows:

1) Initialization. This process analyzes the search pattern and the graphical scene. It builds data structures representing those properties of the scene and search pattern objects that are relevant to the search. These data structures are sorted to improve the efficiency of subsequent computations.

2) Search. This process compares the data structures for the search pattern to the data structures representing the scene to find the next match for the search pattern in top-to-bottom, left-to-right order.

3) Replace. If a match is found, this process selects those scene objects that matched the search pattern. Then, if a replacement is to be performed, the process replaces the specified properties of the matched objects by the corresponding properties described in the replacement pattern. The process distinguishes the shapes that are added to the scene during this replace phase from the original scene objects, since only the original scene objects are eligible to be matched in subsequent search phases, until the user causes a new initialization to be performed.

The following sections are subdivided to separately describe (1) how the lead search object is chosen, (2) the main data structures used during search and replace, (3) initialization, searching, and replacing, and (4) how the data structures are kept up to date during these phases.

1. The Lead Curve and the Lead Object

One of the most important results of the initialization phase is the choice of a lead search object, also referred to more concisely as simply the "lead object". The lead search object is a cluster if granularity=cluster, or a curve if granularity=curve or segment. During the search phase, the process always tries to find a match for the lead object before trying to find matches for any of the other objects in the search pattern. Any object in the search pattern can be used as a lead object.

One of the curves of the lead object is chosen as the "lead curve". Of all of the curves in the lead object, this is the first curve that will be compared against a scene curve in the process of comparing the lead object against a scene cluster or curve. Any object in the search pattern can be used as a lead object and any curve as the lead curve.

However, if the lead curve is chosen carefully, the search will proceed more rapidly than it would otherwise. For instance, it is but to choose a lead curve that matches itself at the fewest possible orientations. Even more particularly, FIGS. 22A-22D show four curves in decreasing order of preferability as lead curves. An open curve, like the one in FIG. 22A, is best because it can match other curves of the same shape at only a single orientation. In general, open curves can match other open curves in at most two orientations. Next best is a closed curve with no symmetry, like the one in FIG. 22B, because it can match itself in only one orientation. Shapes with finite rotational symmetry, like the square shown in FIG. 22C, are next in order of preference because they can match themselves at several orientations. Lastly, a circle, such as shown in FIG. 22D, can match itself at any number of orientations, making it the worst possible choice for a lead curve.

During the search phase, the lead object is compared to each object in the scene, until a complete match is found for the entire search pattern. When the first canonical form of the lead curve matches a scene curve, it often is necessary to compare other canonical forms of the lead curve to the scene curve as well, in order to find a transformation that matches the rest of the search curves to corresponding scene curves. Thus, it will be evident that if a lead curve with little symmetry (and hence few canonical forms) is chosen the number of comparisons is minimized.

2. The Main Data Structures

During the search and replace phases, the process must keep track of three different, but not mutually exclusive, sets of curve segments. These sets are:

1) Eligible Set. The eligible set includes all segments in the scene that are still eligible to be matched. Just after initialization, this set includes all of the segments that are ahead of the caret or other indicator used to identify the portion of the scene that is eligible to be searched. After a search phase succeeds in matching one or more segments, these matched segments are removed from the eligible set.

2) Tentative Set. The tentative set is non-empty only during a search phase. It includes those segments in the scene that are matched by corresponding segments in the search pattern under a proposed transformation. They are only matched tentatively while there are one or more segments in the search pattern for which no matching scene segment has been found. The tentative set becomes empty again once all segments in the search pane 23 (FIG. 2A) have found matching scene segments using the proposed transformation, or once the process determines that no such matching segments can be found. All segments in the tentative set must also be in the eligible set.

3) Ordered Set. The ordered set includes those segments from the eligible set that have not yet been exhaustively compared to the lead object of the search pattern. By definition, (i) these segments have not been matched in a previous search phase, and (ii) in the current search phase, there are still one or more untried orientations of the lead object that might map the lead object onto these segments.

There is a complete ordering on the segments in the ordered set. This ordering is derived from the ordering on curves. In particular, if granularity=cluster, then clusters are ordered top-to-bottom and left-to-right by the upper left hand corner of their bounding boxes. Thus, if cluster A precedes cluster B in this ordering, then all curves of A precede all curves of B. Of course, within a cluster, curves have an order that the user gave them when the cluster was made. Finally, within a curve, segments use the natural order described hereinabove. If granularity=curve or segment, then curves are ordered by the upper left hand corner of their bounding boxes, and segments within curves use their natural order. As will be seen, the foregoing rules define a complete ordering on segments. However, it is to be understood that when the user searches in reverse order (bottom-to-top, right-to-left) this segment order is reversed. Suitable implementations of these three different sets are set forth below.

Ordered Set. The ordered set typically is represented by a set of bits and a list of clusters or curves. A bit, called the "ahead bit", is stored in each scene segment. If a segment's ahead bit is 1 (TRUE), that segment has not yet been exhaustively compared to the lead object of the search pattern. Otherwise, the segment has been exhaustively compared. In addition, all clusters all of whose segments contain TRUE ahead bits (if granularity=cluster), or all curves all of whose segments contain TRUE ahead bits (if granularity=curve), or all curves any of whose segments contain TRUE ahead bits (if granularity=segment) are placed on a list, called the "ahead list". The ahead list is sorted by the upper left hand corner of the bounding boxes of its elements.

Eligible Set. The eligible set suitably is represented by a set of bits and a list of clusters or curves. A bit, called the "match bit", is stored in each scene segment. If a segment's match bit is 1 (TRUE), that segment has not yet been matched since the last initialization phase. If the bit is 0 (FALSE) then the segment has been matched since the last initialization phase, and thus is no longer eligible to be matched. In addition, all clusters all of whose segments contain TRUE match bits (if granularity=cluster), or all curves all of whose segments contain TRUE match bits (if granularity=curve), or all curves any of whose segments contain TRUE ahead bits (if granularity=segment) are placed on a list, called the "scene list". The scene list is stored in two parts. The first part is the ahead list, which is also used to represent the ordered set. It is ordered as described above. The second part, called the "behind list", is stored in no particular order. It contains all of the clusters or curves that contain eligible segments that are no longer on the ahead list.

Tentative Set. A bit, called the "tentative bit", is stored in each scene segment. If a segment's tentative bit is 1 (TRUE), that segment is being tentatively matched to a corresponding segment in the search pattern. Otherwise, that segment is not yet part of a tentative match.

3. Initialization

During initialization, the process builds a list of all of the scene shapes that are ahead of the caret in top-to-bottom, left-to-right order, where the upper left hand corner of the bounding boxes of an object is used to determine its position in the ordering of the list. These shapes are the only shapes searched until the next initialization. For each object on the list, the appropriate bits are set to show that all segments of the object are in the ordered set and in the eligible set, and that none of the segments are in the tentative set. Finally, for each object in the search pattern, the values of those properties that the user is interested in searching for (e.g., the color of each segment, or the area color of an outline) are extracted, so that these properties are easy to access during the search phase of the process.

There are several circumstances that cause initialization to be performed. First, if a particular scene has never been searched, an initialization is required to build the required data structures, which include the canonical curve forms. Second, when reversing the search direction, the scene objects must be reversed so that they can be searched in a bottom-to-top order instead of a top-to-bottom order (or vice-versa). Third, if the user has edited the scene by hand or moved the caret to a new position, an initialization is required to make sure that the search will begin with the first object that is ahead of the caret. Finally, if the search pattern has changed since the last search, new data structures must be built to represent the edited scene faithfully. Of course, the data structures that represent the scene are different depending on the granularity of the search and on whether or not the search is to be rotation invariant or scale invariant. Thus, changing the search parameters also requires recomputing the data structures that represent the scene.

4. Searching

As previously pointed out, the so-called lead curve of the search pattern is compared during the search phase against the curves in the scene essentially in a top-to-bottom order. The canonical forms of the lead curve and one of the canonical forms of each scene curve are used to compute the comparison. Once a match for the lead curve has been formed using a particular affine transformation, T, to align the lead curve with a corresponding scene curve, the process attempts to match the rest of the curves in the search pattern against corresponding scene curves, using that same transformation, T. If the process succeeds in matching all of the search curves using the transformation T, then it is done. Otherwise, it tries to find other transformations to match the lead curve to the same given scene object. However, once all plausible transformations have been exhausted, the process quits trying to match the lead curve to the current scene curve, and steps ahead to try matching the lead curve against the next scene curve in sequence.

To avoid matching several search pattern curves to the same scene curve, the tentative bits described above are used to keep track of which scene segments have already been matched to corresponding segments in the search pattern under the proposed transformation, T. If it turns out that it is not possible to match all of the search curves under a certain transformation T, all of the tentative bits are cleared, and a new transformation is proposed. Thus, it will be understood that the search phase ends either when a match is found for all curves in the search pattern or when there are no further scene curves to compare against the lead curve of the search pattern. In the former case, the existence of a match is confirmed, while in latter case the search fails.

When matching on shape, a constrained search may be is employed to improve performance. When a match for the lead object has been found, the location of that match at least roughly indicates where in the scene to look for the remaining shapes in the pattern list. Accordingly, the bounding boxes can be used used to quickly rule out many of the remaining objects on the search list. Furthermore, by computing where one point of a given search pattern object maps when a particular transformation T is applied to a search object, it is possible to rule out all objects on the search list whose bounding boxes do not contain the transformed point. In practice, if the search is not exact, the bounding boxes are enlarged by an amount proportional to the tolerance before testing the point for inclusion. Yet another expeditor takes advantage of the fact that the search list is ordered by the upper left hand corner of the bounding boxes, so entire sections of the search list can be ruled out quickly.

When granularity=segment, the search mechanism is somewhat more elaborate. Objects in the pattern list are matched against both entire objects and portions of objects in the search list. Therefore, whenever a match is found, information is saved indicating precisely where the search terminated, so the next search can continue with another part of the same search list object if any of its parts have not yet been unexamined. Furthermore, after a match is found, the search list is updated to disallow future matches on the same objects. The matching objects in the editing window 22 (FIG. 2A) that were found by the search are selected, and all other objects are deselected. That performs a dual function. First, the selection feedback indicates to the user which set of objects has been matched. Second, it prepares the matched objects to be modified by any of the editor operations that act on selected objects, including deletion, color changes, and transformations. In a Gargoyle editor, the software caret is relocated to the position of the match. If a Yes or ChangeAll is in progress, a replacement or macro operation will be performed at this point.

5. Replacing

Once a match is found, there is a known transformation, T, that maps all of the search pattern curves onto corresponding curves in the graphical scene. The process has also established a correspondence between curve segments in the search pattern and their matching curve segments in the scene. Consequently, at this point, if a replacement is to be made, the Replace Column of the user interface (FIG. 5) is examined. If only non-shape properties (i.e., graphical styles) are being replaced, the values of these properties are extracted from the shapes in the replace pane 24 (FIG. 2A) and applied to the matched objects. If, on the other hand, shapes are being replaced, the matched objects are deleted and the objects in the replace pane 24 are copied into the scene. The new scene objects then inherit from the matched shapes the properties not specified in the Replace Column (FIG. 5) as explained above.

New scene objects are positioned in the scene during the replacement phase depending on whether the search process is matching on shape or not. When matching on shape, the transform T is applied to the replace pane shapes. Otherwise, the replacement object is positioned so that the center of its bounding box coincides with the center of the bounding box of the matched object.

In digital synthetic graphical scenes, all objects (e.g., outlines and clusters) are drawn in a particular order. Objects drawn later may obscure (be layered on top of) objects that were drawn earlier. Therefore, during a replace operation where shape is being replaced, it is desirable whenever possible to position the new shapes at the same positions in the layered ordering of such objects as the shapes they are replacing. However, since the matched objects may occur at several different positions in this ordering, the replacement objects for them are placed so that they will all be drawn at the earliest point in the layering that any of the matched objects, 0, would have been drawn. Within themselves, the replacement objects maintain the drawing order or layering that they had when they were in the replace pane 24 (FIG. 2A).

Once the scene is updated, it is necessary to update the data structures that represent the scene for search purposes. To that end, all references to segments that have been replaced are removed from these data structures. Furthermore, the segments most recently compared to the lead curve are identified, so that the next search operation can take up with the segments that follow them in segment order.

B. Simplified Flow Charts and Pseudo-Code for the Search and Replace Operation

1. Flow Chart Overview of the Search and Replace Algorithm

When the user selects the ChangeAll option (FIG. 2A), all three phases of graphical search and replace are performed. First, the data structures are built during the initialization phase. Then the search phase and the replace phase are performed alternately until the entire scene region of interest has been searched. The flow chart shown in FIG. 22 gives an overview of the search and replace algorithm for ChangeAll.

2. Pseudo-Code Description of Initialization

The pseudo-code below describes in more detail how the aforementioned search data structures are built. As previously pointed out, the format of the data structures is different depending on the type of search that is to be performed. As will be seen, the chief variables of interest during the initialization phase are:

1) direction. If direction=forward, the process looks for the next match in top-to-bottom, left-to-right order. If direction=backward, it looks for the next match in bottom-to-top, right-to-left order.

2) lastDirection. lastDirection is the value that "direction" had during when the immediately preceding search.

3) granularity. As will be recalled, granularity can take on the values "cluster", "curve",or "segment".

4) aheadList. A list of records whose structure is described in the following description of "objectInfo". The aheadList refers to all clusters or curves that contain segments that are in the ordered set, except for those that already have been exhaustively compared against the lead search object.

5) behindList. behindList is also a list of "sceneInfos". It points to all clusters or curves that contain segments that are still eligible to be matched but contain no segments that are in the ordered set. In other words, all of the segments of these clusters or curves have been exhaustively compared against the lead object.

6) objectInfo. If granularity=cluster then objectInfo represents one cluster in the search pattern. If granularity=curve or segment, it represents one curve in the search pattern.

7) searchList. A list of records, whose structure is described below in the description of "objectLooks". searchList has one list element for each object, o, in the search pattern.

8) objectLooks. If granularity=cluster then objectLooks represents one cluster in the search pattern. If granularity=curve or segment, it represents one curve in the search pattern. objectLooks is a list with one element for each curve, c, in its associated object(if granularity=curve or segment there is only one such curve). The element corresponding to each curve is itself a list with one element for each segment in the curve. Each segment element describes the graphical properties of a single segment, s. These properties include: the shape of segment s, the class of the associated object, o, the curve type of segment s, the line color of segment s, the full color of the related curve c, the dash pattern of segment s, the stroke joint style of curve c, the stroke end style of curve c, and the stroke width of segment s. objectLooks also contains two fields, orientationCount and polylineCount that describe two properties of the curve of objectLooks that has the least symmetry. Specifically, the orientationCount is the number of canonical orientations of that particular curve, and the polylineCount is the number of line segments in the polyline approximation of that curve.

9) lastCaretPos. This variable is a point (an x-y coordinate pair) used to keep track of where the process placed the caret the last time a match was found.

10) caretPos. This variable is another point (another x-y coordinate pair) showing where the caret is currently located. Since the user can move the caret, caretPos may or may not be the same as lastCaretPos.

11) match bits. Each curve segment in the scene has an associated Boolean variable, called its "match bit", which is TRUE if that curve segment has never been matched and FALSE if it has been matched.

The four routines described below accomplish the initialization. InitializeSearch is the main routine. It calls the MakeTheAheadList routine and the AnalyzeSearchPattern routine. The MakeTheAheadList routine, in turn, calls the DescribeObjectForSearch routine.

```
InitializeSearch: PROCEDURE = {
    aheadList ← NIL; behindList ← NIL; -- both lists are initialized to the empty list
    IF caretPos ≠ lastCaretPos OR this is the first time "Search" was pressed THEN {
        CALL procedure MakeTheAheadList; -- builds "aheadList" from scratch
    }
    ELSE IF direction ≠ lastDirection THEN { -- search direction has changed
        CALL procedure MakeTheAheadList; -- builds "aheadList" from scratch
        FOR each curve, c, such that some of its segments were matched by the previous Search
        operation DO
            Set to FALSE the ahead bits of those segments of c that were just matched. -- so when
            we reverse the search direction, we don't match the same segments again
            IF all of the ahead bits of c are now FALSE THEN {
                Remove c from the ahead list.
                Place c on the behind list.
            };
        END LOOP on matched curves.
    };
    IF this is the first time "Search" was pressed OR the search pattern has been edited since the
    previous search THEN {
        CALL procedure AnalyzeSearchPattern; -- builds "searchList" from scratch
    };
};

MakeTheAheadList: PROCEDURE = {
    Set to FALSE the match bits of all segments in the scene.
```

Set to FALSE the ahead bits of all segments in the scene.
FOR each scene object, o, that is ahead of the caret DO
    CALL procedure DescribeObjectForSearch(o, aheadList) to add a description of the
      curves of o to the aheadList;
    Set to TRUE the ahead bits of all segments of o;
    Set to TRUE the match bits of all segments of o;
    END LOOP on scene objects;
IF direction = forward THEN sort "aheadList" by decreasing y coordinate of the upper left
  corner of the bounding box of each curve
ELSE sort "aheadList" by increasing y coordinate of the upper left corner of the bounding
  box of each curve;
};

DescribeObjectForSearch: PROCEDURE (o: Scene Object, bigList: List of "objectInfo") = {
  objectInfo ← NIL;
  FOR each curve, c, that is a component of o (considering curves in forward order if direction
    = forward and in reverse order if direction = reverse) DO
    curveInfo ← NIL;
    FOR each segment, s, that is contained in c (considering segments in forward order if
      direction = forward and in reverse order if direction = reverse) DO
      FOR each property of s, p, that the user has turned on DO
        IF p is the Shape property, and we are using the polyline matching algorithm,
          convert s to a polyline and use the polyline as the shape;
        Record the value of p associated with s in a record, "info";
      END LOOP on properties;
      Add "info" to the list "curveInfo";
    END LOOP on segments;
    IF granularity = segment OR granularity = curve
      THEN Add "curveInfo" to the list bigList
      ELSE Add "curveInfo" to the list "objectInfo"; -- granularity = cluster
  END LOOP on curves;
  IF granularity = cluster THEN Add "objectInfo" to the list bigList;
};

AnalyzeSearchPattern: PROCEDURE = {
  searchList ← NIL;
  FOR each object, o, in the search pattern DO
    objectLooks ← NIL;
    FOR each curve, c, that is a component of o DO
      curveLooks ← NIL;
      FOR each segment, s, that is contained in c DO
        FOR each property of s, p, that the user has turned on DO
          IF p is the Shape property, and we are using the polyline matching algorithm,
            convert s to a polyline and use the polyline as the shape;
          Record the value of p associated with s in a record, "looks";
        END LOOP on properties;
        Add "looks" to the list "curveLooks";
      END LOOP on segments;
      IF granularity = segment OR granularity = curve
        THEN Add "curveLooks" to the list "searchList"
        ELSE Add "curveLooks" to the list "objectLooks"; -- granularity = cluster
    END LOOP on curves;
    IF granularity = cluster THEN Add "objectLooks" to the list "searchList";
  END LOOP on objects;

CALL SortSearchShapes on the resulting list "searchList" to improve search efficiency.
*[When SortSearchShapes returns, the first element of searchList is the lead object.]*
};

SortSearchShapes: PROCEDURE = {
   IF we are not searching for the "shape" property
      THEN leave searchList alone
      ELSE {
         FOR each element, e, in the list "searchList" DO
            bestCurve ← that curve of e that has the least symmetry;
            e.orientationCount ← the number of canonical orientations of bestCurve;
            e.polylineCount ← the number of line segments in the polyline approximation of
               bestCurve;
         ENDLOOP;
         Sort the list "searchList" in order of increasing orientationCount. Where there are
         ties, sort in order of increasing polylineCount.
      };
};

3. Pseudo-Code Description of Searching

The pseudo-code below describes how the search is performed. Simply stated, the list "searchList" and the lists "aheadList" and "behindList", which were built during the above-described initialization phase, are compared against each other to find objects in "searchList" that match corresponding objects in "aheadList" and "behindList". During the search, scene objects are moved from aheadList to behindList when they have been exhaustively compared to the lead object of the search pattern.

In addition to the variables introduced in the initialization phase, the following variables are used during the search phase:

1) thisAhead. Describes the scene object that is currently being compared against the lead object of the search pattern. thisAhead is the first element of aheadList.

2) positionD. positionD (short for "position descriptor") lists all of the tranformations that take the current lead curve into corresponding segments of thisAhead.

3) mapping. mapping is a list of pairs, where the first element is an object, curve, or segment in the search pattern, and the second element is the matching object, curve, or segment in the scene.

4) sceneList. sceneList is a list containing all of the elements of aheadList and all of the elements of behindList, where all of the ordered elements of aheadList, precede the elements of behindList, which are in no particular order. The sceneList contains all of the scene segments that are in the eligible set.

5) tentative bits. Each segment in the scene has a tentative bit. This bit is TRUE if and only if that segment has been tentatively matched with a corresponding segment in the search pattern.

6) thisAheadParts. Describes those parts of thisAhead that matched leadObject during the most recent call to the MatchLeadObject procedure.

7) nextAheadParts. Describes those parts of thisAhead that have not yet been exhaustively compared with leadObject, and are eligible to be matched.

8) polarityOn. polarityOn is TRUE if the optional Polarity search parameter (see FIG. 3) is activated. Otherwise, polarityOn is FALSE.

9) shapeOn. shapeOn is TRUE if the optional Shape parameter is turned on in the Search Column (see FIG. 5). shapeOn is FALSE otherwise.

FALSE otherwise.

FindNextMatchAndSelectIt: PROCEDURE = {
   CALL procedure MatchSearchPattern;
   IF MatchSearchPattern succeeds THEN {
      De-select all scene objects;
      IF this is a context-sensitive search THEN {
         Select those matched scene objects corresponding to the objects that are selected in
            the Search Pane;
      }
      ELSE {
         Select all matched scene objects;
      };

```
        lastCaretPos ← caretPos;
        caretPos ← the upper left hand corner of the bounding box of the scene object that
            matched the lead search object;
        }
    ELSE {
        De-select all scene objects;
        Tell the user there are no more matches;
        };
    };

MatchSearchPattern: PROCEDURE = {
    Set to FALSE the tentative bits of all segments on the sceneList.
    IF searchList = NIL OR aheadList = NIL THEN RETURN failure;
        [There is no search pattern or no scene objects left to search through]
    leadObject ← the first element of "searchList";
    otherObjects ← the rest of the elements of "searchList";
    thisAhead ← the first element of "aheadList";
    UNTIL aheadList is empty or a match is found DO
        positionD ← nothing;
        mapping ← NIL;
        IF one or more segments of thisAhead have TRUE ahead bits THEN {
            CALL procedure MatchLeadObject(thisAhead, leadObject);
            IF MatchLeadObject succeeds in finding a match THEN {
                [thisAheadParts, nextAheadParts, and positionD have new values]
                Set to TRUE the tentative bits of all segments mentioned in thisAheadParts.
                CALL procedure MatchOtherObjects(otherObjects);
                IF MatchOtherObjects succeeds THEN GOTO MatchFound;
                FOR each untried orientation in "positionD" DO
                    CALL procedure MatchLeadObject(thisAhead, leadObject);
                    IF MatchLeadObject succeeds in finding a match THEN {
                        CALL procedure MatchOtherObjects(otherObjects);
                        IF MatchOtherObjects succeeds THEN GOTO MatchFound;
                    };
                END LOOP on orientations;
                GOTO MatchFailed;
            }
            ELSE GOTO MatchFailed;
            MatchFound:
                Set to FALSE the ahead bits of all segments in thisAhead, except those in
                    nextAheadParts;
                IF all ahead bits of thisAhead are FALSE THEN {
                    Remove thisAhead from aheadList;
                    Add thisAhead to behindList;
                };
                Set to FALSE the match bits of all segments in mapping;
                RETURN success;
            MatchFailed:
                Set to FALSE the ahead bits of all segments in thisAheadParts;
                thisAhead ← nextAheadParts;
        }
        ELSE { -- There are no more parts left in thisAhead. On to the next thisAhead.
            Remove thisAhead from aheadList;
            Add thisAhead to behindList;
```

```
            IF aheadList is empty THEN RETURN failure;
            thisAhead ← the first element of aheadList;
            };
        END LOOP on aheadList;
};

MatchLeadObject: PROCEDURE (sceneParts, searchObject) = {
    IF granularity = segment THEN {
        c ← the curve represented by sceneParts;
        t ← the curve represented by searchObject;
        CALL procedure MatchLargestRun(c, t);
        [MatchLargestRun finds the largest run of segments, "matchedParts", on c that matches
            (all of) t]
        IF no run of segments matches searchObject (matchedParts = NIL) THEN {
            nextAheadParts ← NIL;
            RETURN failure;
            }
        ELSE {
            nextAheadParts ← sceneParts minus all of the segments in matchedParts and all
                segments of c that come before the segments in matchedParts (if matchedParts
                matched searchObject in forward order) or all segments of c that come after
                matchedParts (if matchedParts matched searchObject in reverse order);
            RETURN success;
            };
        };
    IF granularity = curve THEN {
        c ← the curve represented by sceneParts;
        t ← the curve represented by searchObject;
        CALL procedure MatchTwoCurves(c, t);
        nextAheadParts ← NIL;
        IF MatchTwoCurves finds that c and t match THEN {
            matchedParts ← c;
            RETURN success;
            };
        matchedParts ← NIL;
        RETURN failure;
        };
    IF granularity = cluster THEN {
        CALL MatchAllCurves(sceneParts, searchObject);
        IF MatchAllCurves succeeds in matching sceneParts to searchObject
        THEN GOTO ClusterMatchFound;
        ELSE GOTO ClusterMatchFailed;
        ClusterMatchFound:
            matchedParts ← sceneParts;
            nextAheadParts ← NIL;
            RETURN success;
        ClusterMatchFailed:
            matchedParts ← NIL; nextAheadParts ← NIL;
            RETURN failure;
        };
};
```

MatchOneObject: PROCEDURE (sceneParts, searchObject) = {
    This routine is just like MatchLeadObject, except that all of the lines of code that modify
    nextAheadParts are omitted.
};

MatchOtherObjects: PROCEDURE [otherObjects: List of objectLooks] = {
    IF otherObjects = NIL THEN {
        RETURN success; -- *there is nothing left unmatched. We've matched everything*
    };
    thisObject ← the first element of otherObjects;
    IF shapeOn THEN {
        Use the transformation in positionD to find where the starting point of thisObject
          should be placed in the scene. Call this position "samplePoint".
    };
    FOR each object o, on sceneList DO
        IF samplePoint does not fall within the bounding box of o THEN GOTO NextObject;
        Let sceneParts be those segments of o whose tentative bits are FALSE;
        IF sceneParts contains one or more segments THEN {
            CALL procedure MatchOneObject(sceneParts, thisObject);
            IF MatchOneObject matches all of thisObject to some of the segments of sceneParts,
                call them collectively "matchedParts"
            THEN {
                Set to TRUE the tentative bits of all segments in matchedParts;
                CALL procedure MatchOtherObjects(otherObjects minus thisObject);
                IF MatchOtherObjects succeeds THEN RETURN succeeds;
                ELSE {
                    Set to FALSE the tentative bits of all segments in matchedParts;
                    Restore "mapping", to the value it held when the present call to
                      MatchOtherObjects began.
                };
            };
        };
    NextObject:
    END LOOP on objects in sceneList;
    *[If we reach this line, then there is no object in the scene that matches thisObject at the current
    proposed transformation]*
    RETURN failure;
};

MatchLargestRun: PROCEDURE (c: Curve, t: Curve) = {
    FOR each property, p, that is in the set {area color, object class, stroke joint} and is active in
        the Replace Column DO
        IF the value of p in c differs from the value of p in t
            THEN RETURN failure;
        END LOOP on properties;
    Let n be the number of segments in c;
    Let m be the number of segments in t;
    FOR each integer i from 1 to n-m+1 DO
        FOR each integer j from 1 to m DO
            thisSceneSegment ← segment number i+j-1 of c;
            thisSearchSegment ← segment number j of t;
            CALL procedure CompareSegmentProperties(thisSceneSegment,
                thisSearchSegment);

```
            IF CompareSegmentProperties fails THEN GOTO TryReverse;
        END LOOP on j;
        GOTO PropertiesMatched;
    TryReverse:
        IF polarityOn is FALSE THEN {
            FOR each integer j from m to 1 DO
                thisSceneSegment ← segment number i+j-1 of c;
                thisSearchSegment ← segment number j of t;
                CALL procedure CompareSegmentProperties(thisSceneSegment,
                    thisSearchSegment);
                IF CompareSegmentProperties fails THEN GOTO TryNextI;
            END LOOP on j;
            GOTO PropertiesMatched;
        }
        ELSE GOTO TryNextI;
    PropertiesMatched:
        matchedParts ← the segments of c from i through i+m-1;
        IF shapeOn is FALSE THEN GOTO MatchFound;
        CALL procedure CompareCurveShape(matchedParts, t);
        [If positionD has no transforms, and CompareCurveShape finds a match, positionD
            will now have a list of the transforms that take t into matchedParts]
        IF CompareCurveShape succeeds THEN GOTO MatchFound
        ELSE {
            matchedParts ← NIL; -- try next i (try the next run of segments of curve c)
            GOTO TryNextI;
        };
    MatchFound:
        Update mapping to show that segments i through i+m-1 of c have been matched to
            segments 1 to m of t;
        RETURN success;
    TryNextI:
    END LOOP on i;
    RETURN failure;
};

MatchTwoCurves: PROCEDURE (c: Curve, t: Curve) = {
    Let n be the number of segments in c;
    Let m be the number of segments in t;
    IF m ≠ n THEN RETURN failure;
    CALL procedure MatchLargestRun(c, t);
    RETURN the results of MatchLargestRun;
};

MatchAllCurves: PROCEDURE (sceneParts, searchObject) = {
    Let n be the number of curves in sceneParts;
    Let m be the number of curves in searchObject;
    IF n ≠ m THEN {
        [sceneParts and searchObject obviously do not match]
        RETURN failure;
    };
    c ← the first curve of sceneParts;
    t ← the first curve of searchObject;
    CALL procedure MatchTwoCurves(c, t);
    [If positionD has no transforms, and MatchTwoCurves finds a match and shapeOn is TRUE,
```

*positionD will now have a list of the transforms that take t into c]*

IF MatchTwoCurves fails THEN RETURN failure;

FOR each transformation in positionD (or do just once if shapeOn is FALSE) DO

FOR each integer i from 2 to n DO c ← the $i^{th}$ curve of sceneParts;

t ← the $i^{th}$ curve of searchObject;

CALL procedure MatchTwoCurves(c, t);

IF MatchTwoCurves fails THEN GOTO NextTransform;

END LOOP on curves in sceneParts;

RETURN success;

NextTransform:

END LOOP on transformations;

};

CompareSegmentProperties: PROCEDURE (thisSceneSegment, thisSearchSegment) = {

FOR each property, p, that is in the set {curve type, line color, line dashes, line ends, line width} and is active in the Replace Pane DO IF the value of p in thisSceneSegment ≠ the value of p in thisSearchSegment THEN RETURN failure;

END LOOP on properties;

RETURN success;

};

As will be seen from the above psuedo-code, when the user selects "Search" (FIG. 2A), a FindNextMatchAndSelectIt routine is called. It, in turn, calls MatchSearchPattern. MatchSearchPattern then calls MatchLeadObject and MatchOtherObjects. Furthermore, it will be noted that the MatchOtherObjects routine calls itself recursively, so it is re-entrant. Additionally, it should be observed that MatchLeadObject and MatchOtherObjects both rely on three routines: MatchLargestRun, MatchTwoCurves, and MatchAllCurves. The MatchLargestRun routine is used when granularity=segment, while the MatchTwoCurves routine is used when granularity=curve, and the MatchAllCurves routine is used when granularity=cluster. Each of the last mentioned routines, in turn, call (i) CompareSegmentProperties, which compares two segments to determine if they have the same color, stroke width, dash pattern, and stroke end shapes, and (ii) CompareCurveShape, which uses the abovedescribed curve matching algorithms to compare the shape of the two curves.

4. Simplified Flow Chart of Replace Phase

An overview of the replace phase of the search and replace process is shown in FIG. 22. If a determination is made at 91 that the user has asked the process to perform a set of macro operations after each search, then the recorded actions are played back as at 92. Alternatively, it may be determined at 91 that shapes and properties are to be replaced. In that event, if it is further determined at 93 that the "shape" property is active in the Replace Column of the user interface (FIG. 5), then the matched shapes are deleted and replaced, as at 94, with the shapes in the replace pane 24 (FIG. 2A), possibly modifying these replacement shapes with properties from the matched shapes as determined by the graphical property selecting (FIG. 5) made by the user. Otherwise the shapes are left as is, while applying properties from the replace pane 24 to the matalched objects as at 95. Finally, the aheadList is updated, as at 96, in preparation for the next search phase.

5. Psuedo-Code Description of Replace Phase

The main variables of the proposed replace algorithm are:

1) propsToTransfer. As described above, a resultant object is created by combining a replacement shape (from either the matched objects or the replacement pattern) with graphical properties (from either the matched objects or the replacement pattern). If the shape comes from one source, but some graphical properties come from the other source, then the graphical properties must be transferred from their source to the shape. propsToTransfer is a list of the properties that are to be transferred.

2) replaceShape. replaceShape is TRUE if the optional "shape" parameter is active in the Replace Column (FIG. 5). Otherwise, replaceShape is FALSE.

3) shapeSource is either the replacement pattern (if replaceShape is TRUE) or the matched shapes otherwise.

4) propsSource is either the matched shapes (replaceShape is TRUE) or the replacement pattern otherwise.

The pseudo-code for the replace operation consists of three routines. Replace is the main routine. It calls a DoSegmentsLookTheSame routine to make sure that the replace is unambiguous, as well as a TransferProperties routine to apply graphical properties from either the matched objects or the replacement pattern to create the new scene objects. Additionally, Replace also calls an UpdateOrderedSet routine to incrementally update the aheadList so that the aheadList will be ready for the next search operation.

Replace: PROCEDURE = {
   IF the user has requested that a replace be done after each search THEN {
      IF replaceShape is TRUE THEN {
         propsToTransfer ← those graphical properties that are NOT active in Replace
           Column;
         sourceSegments ← all of the segments of the objects that were matched;
         CALL procedure DoSegmentsLookTheSame(propsToTransfer, sourceSegments);
         IF DoSegmentsLookTheSame succeeds THEN {
            Delete the matched shapes;
            Copy the replacement shapes and transform the copies using the transformation
              that succeeded in mapping the search objects onto the matched objects;
            Add the copies to the scene;
            shapesSource ← the copies of the replacement shapes;
            propsSource ← the matched shapes;
            CALL procedure TransferProperties(propsToTransfer, propsSource,
              shapesSource);
         }
         ELSE RETURN failure; -- *the replacement cannot be done*
      }
      ELSE { -- *leave the shape of the matched objects alone*
         propsToTransfer ← those graphical properties that are active in the Replace Column;
         sourceSegments ← all of the segments in the replacement pattern;
         CALL procedure DoSegmentsLookTheSame(propsToTransfer, sourceSegments);
         IF DoSegmentsLookTheSame succeeds THEN {
            shapesSource ← the matched shapes;
            propsSource ← the replacement pattern;
            CALL procedure TransferProperties(propsToTransfer, propsSource,
              shapesSource);
         }
         ELSE RETURN failure; -- *the replacement cannot be done*
      };
   }
   ELSE { -- *the user has requested that macro operations be performed after each search*
      Playback the macro operations, transforming the cursor coordinates using the
         transformation that succeeded in mapping the search objects onto the current matched
         scene objects.
      *[Note: the macro operations may move caretPos. Fix this before the next search phase.]*
      caretPos ← lastCaretPos;
   };

```
CALL procedure UpdateOrderedSet;
};

DoSegmentsLookTheSame: PROCEDURE (propsToTransfer: Graphical Properties,
    sourceSegments: A List of Segments) = {
    Let s₀ be the first segment in the replaceList;
    FOR each segment, s, in sourceSegments DO
        FOR each property, p, in propsToTransfer DO
            IF the value of p for s₀ is not equal to the value of p for s THEN RETURN failure;
            END LOOP on properties;
        END LOOP on segments;
    RETURN success;
};

TransferProperties: PROCEDURE (propsToTransfer: Graphical Properties, propsSource:
    Graphical Pattern, shapesSource: A List of Segment) = {
    FOR each property, p, in propsToTransfer DO
        IF property applies to an entire graphical object (e.g., FillColor) THEN {
            FOR each object, o, in shapesSource DO
                Set property p of o to the value p has in propsSource;
                END LOOP on objects;
        }
        ELSE { -- the property applies to segments
            FOR each segment, s, in shapesSource DO
                Set property p of s to the value p has in propsSource;
                END LOOP on segments;
        };
    END LOOP on properties;
};

UpdateOrderedSet: PROCEDURE = {
    thisAheadCurve ← the first curve on the aheadList;
    IF some parts of thisAheadCurve have just been deleted (by a macro operation) or replaced,
    but not all parts THEN {
        [thisAheadCurve may be broken into several pieces]
        Remove from aheadList those data structures representing thisAheadCurve;
        newCurveList ← NIL; -- newCurveList begins as an empty list
        FOR each curve, c, of thisAheadCurve that remains DO
            CALL procedure DescribeObjectForSearch(c, newCurveList) to add a description of
                c to the newCurveList;
            ENDLOOP;
        Add all of the elements of newCurveList, retaining their order, to the *beginning* of
            aheadList.
    };
};
```

CONCLUSION

Figure 24:
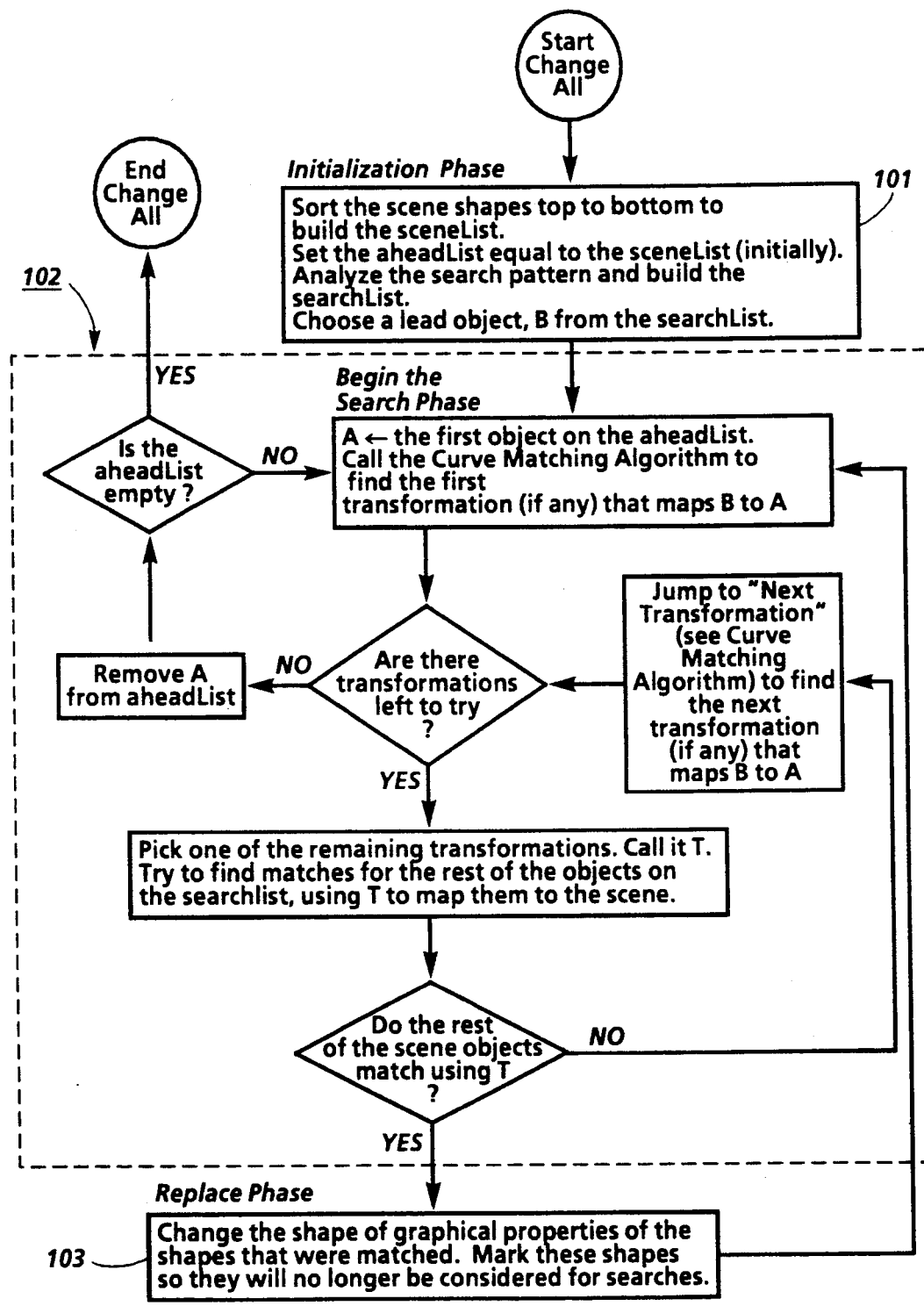
FIG. 24 is a simplified comprehensive flow chart for a graphical search and replace process for performing a user-specified ChangeAll operation in accordance with the present invention.

FIG. 24 summarizes the search and replace process of the present invention for a ChangeAll operation, starting with the initialization phase 101, then following with the search phase 102, and concluding with the replace phase 103. The main steps of the search phase 102 and of the replace phase 103 have already been described at some length, but this flow chart shows the correlation of the different phases of the process to each other when a ChangeAll is being performed. As will be recalled, a similar correlation exists if the user opts to step through the pattern matches that are found one-by-one, although the replace phase 102 then recycles to the initialization phase 101 whenever the user decides to continue a search.

Accordingly, it will now be understood that the present invention provides an efficient and effective method and means for searching digital synthetic graphics data to find patterns which match a user specified graphical search pattern, together with efficient and effective methods and means (i) for performing pre-recorded macro operations on all or some of the matches that are found or (ii) for replacing some or all of the geometric characteristics and graphical properties of the matching patterns that are found with user-specified replacements.

What is claimed:

1. A computerized graphical search and replace process for editing digital synthetic graphical data representing a computer generated n-dimensional scene, where n>1; said process comprising the steps of searching said data in an n-dimensional directed order for n-dimensional graphical patterns matching geometric characteristics and graphical properties of a user-specified n-dimensional graphical search pattern;

selecting one after another of any data patterns that are found during said search to be substantially matched graphically to said search pattern; and editing at least some of said selected data patterns on a case-by-case basis in accordance with user-specified editing instructions.

2. The process of claim 1 wherein said editing instructions are defined by a pre-recorded macro.

3. The process of claim 1 wherein said editing instructions are defined by a user-specified n-dimensional graphical replacement pattern.

4. A computerized graphical search process for finding matches to a user-specified n-dimensional graphical search pattern in digital synthetic graphical data representing a computer generated n-dimensional scene, where n>1; said process comprising the steps of searching said data in a n-dimensional directed order for graphical patterns matching geometric characteristics and graphical properties of a user-specified n-dimensional graphical search pattern; and selecting one after another of any data patterns that are found during said search to be substantially matched graphically to said search pattern.

5. A computerized graphical search process for finding matches, including affine transformed matches, to a user-specified n-dimensional graphical search pattern in digital synthetic graphical data representing a computer generated n-dimensional scene, where n>1; said process comprising the steps of:

computing a first affine transformation for mapping said graphical seach pattern into a canonical form;

searching said data in n-dimensional directed order for potential instances of said search pattern, including permissible affine transformed instances;

computing at least one permissible trial affine transformation for test mapping the canonical form of said search pattern separately into each of said potential instances;

test mapping the canonical form of said search pattern into each of said potential instances of said search pattern in accordance with each trial transformation for such instance; and determining from all test mappings for each potential instance of said search pattern which, if any, of said potential instances are actual instances of said search pattern.

6. The computerized graphical search process of claim 5 further including the step of:

registering user specified affine invariants for limiting said search to graphical patterns exactly matching all specified affine invariants of said graphical search pattern.

7. A computerized graphical search and replace process for editing digital synthetic graphical data representing a computer generated n-dimensional scene by substituting a user-specified n-dimensional graphical replacement pattern, where n>1, for selected instances of a user-specified n-dimensional graphical search pattern when said data includes such instances in unknown affine transformed form; said process comprising the steps of:

computing a first affine transformation for mapping said search pattern into a canonical form;

storing said first affine transformation;

searching said data in n-dimensional directed order for locating potential instances of said search pattern;

computing at least one affine trial transformation for test mapping the canonical form of said search pattern independently into each of said potential instances of said search pattern, whereby each test mapping relates to a particular trial transformation and to a particular potential instance of said search pattern;

determining from each test mapping whether the related trial transformation substantially matches the canonical form of the search pattern to the related potential instance of the search pattern, thereby identifying any actual instances of said search pattern and a related pattern matching affine transformation for each of said actual instances;

storing the related pattern matching affine transformation for each of said actual instances;

selecting certain of said actual instances of said search pattern; and substituting transformed versions of said replacement pattern for said certain instances of said search pattern, each of said versions of said replacement pattern being transformed serially in accordance with said first affine transformation and in accordance with the pattern matching transformation for the instance of said search pattern for which the transformed version of said replacement pattern is being substituted.

8. The graphical search and replace process of claim 7 further including the step of:

registering user-selected affine invariants for excluding selected affine operations from at least some of said affine transformations.

* * * * *